US012608412B2

(12) United States Patent　　(10) Patent No.:　US 12,608,412 B2
Reisdorf et al.　　　　　　　　(45) Date of Patent:　Apr. 21, 2026

(54) SYSTEMS AND METHODS FOR WELL DOCUMENT EXTRACTION

(71) Applicant: Schlumberger Technology Corporation, Sugar Land, TX (US)

(72) Inventors: Andrew Reisdorf, Houston, TX (US); Eric Moscardi, Montpellier (FR); Ashley Weir, Houston, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 0 days.

(21) Appl. No.: 18/817,508

(22) Filed: Aug. 28, 2024

(65) Prior Publication Data

US 2026/0064749 A1　Mar. 5, 2026

(51) Int. Cl.
　　*G06F 16/00*　　(2019.01)
　　*G06F 16/338*　　(2019.01)
　　*G06F 16/34*　　(2019.01)

(52) U.S. Cl.
　　CPC ............ *G06F 16/34* (2019.01); *G06F 16/338* (2019.01)

(58) Field of Classification Search
　　CPC .............................. G06F 16/34; G06F 16/338
　　USPC ......................................................... 707/722
　　See application file for complete search history.

(56) References Cited

U.S. PATENT DOCUMENTS 11,768,834 B1 *　9/2023　Amberden ........ G06F 16/24537
　　　　　　　　　　　　　　　　　　　707/714
12,044,116 B1 *　7/2024　Dyngosz ................. E21B 44/00

12,118,635 B1 *　10/2024　Powell ................. G06N 3/0464
12,129,755 B2 *　10/2024　Kisra ...................... G06Q 10/08
12,140,344 B1 *　11/2024　Chambers, Sr. .... E21B 41/0035
12,147,464 B2 *　11/2024　Pillai ..................... G06F 40/279
12,241,338 B2 *　3/2025　Bayraktar ............. G06F 40/279
12,353,469 B1 *　7/2025　Mahabadi ............. G06F 16/332
2005/0209836 A1 *　9/2005　Klumpen ......... G05B 19/41885
　　　　　　　　　　　　　　　　　　　703/10
2019/0195050 A1 *　6/2019　Revheim ................ G06Q 10/00
2021/0019351 A1 *　1/2021　Dixon .............. G06F 16/90335
2021/0073532 A1 *　3/2021　Torres ................... G06N 3/044
2021/0073839 A1 *　3/2021　Thomas ............ G06Q 30/0205
2021/0348506 A1 *　11/2021　Khan ..................... G06Q 50/06
2021/0357636 A1 *　11/2021　Bao .......................... E21B 41/00
2022/0115100 A1 *　4/2022　Barve ................... G16H 10/60
(Continued)

FOREIGN PATENT DOCUMENTS

WO　　2020162885 A1　8/2020

OTHER PUBLICATIONS

Ma, Z. et al., "Information Extraction from Historical Well Records Using a Large Language Model", arXiv:2405.05438v1, 2024, 15 pages.

*Primary Examiner* — Ann J Lo
*Assistant Examiner* — Rezwanul Mahmood
(74) *Attorney, Agent, or Firm* — Kyle R. Miiller

(57)　　　　ABSTRACT

The present disclosure relates to systems and methods for automatically extracting data from well documents. The systems and methods obtain extracted text from the well documents and create a tailored prompt with instructions for extracting the data from the extracted text. The systems and methods provide the tailored prompt to a large language model. The large language model uses the tailored prompt to automatically extract the data from the extracted text. The systems and methods receive the data from the large language model and present the data in an interactive table.

21 Claims, 13 Drawing Sheets

(56) References Cited

U.S. PATENT DOCUMENTS

| | | | |
|---|---|---|---|
| 2022/0243575 A1* | 8/2022 | Kristensen | E21B 41/00 |
| 2022/0333477 A1* | 10/2022 | Kalyanraman | E21B 44/00 |
| 2024/0241868 A1* | 7/2024 | Pillai | G06F 16/93 |
| 2024/0264988 A1* | 8/2024 | Macneill | G06F 16/215 |
| 2024/0311406 A1* | 9/2024 | Narechania | G06F 40/30 |
| 2024/0378342 A1* | 11/2024 | Ruzhnikov | G06F 30/12 |
| 2024/0403789 A1* | 12/2024 | Menon | G06Q 10/063 |
| 2025/0053835 A1* | 2/2025 | Stephan | G06N 5/04 |
| 2025/0075593 A1* | 3/2025 | Chambers, Sr. | E21B 43/267 |
| 2025/0075619 A1* | 3/2025 | Chambers, Sr. | F24T 50/00 |
| 2025/0111336 A1* | 4/2025 | Michalopulos | E21B 44/00 |
| 2025/0131284 A1* | 4/2025 | Guillot | G06F 40/30 |
| 2025/0198275 A1* | 6/2025 | Antonio | E21B 44/00 |
| 2025/0198277 A1* | 6/2025 | Yerubandi | E21B 47/005 |
| 2025/0298944 A1* | 9/2025 | Soriano Rementeria | E21B 41/00 |
| 2025/0322324 A1* | 10/2025 | Bjontegard | G06F 16/93 |

* cited by examiner

22

602

LLM gpt-4 (connectionsgpt4 model)   »

Prompt

| Managed Prompt | Advanced Prompt |
|---|---|

604

Objective: extract and format well properties, including Well Name, Well API, Well UWI, Well Location, Well Field, from provided text into structured JSON objects.

Instructions and JSON Formatting:

1) Well Name Extraction:
-Extract the Well or Wellbore name as the Well Name.
-If no Well Name is found, output "N/A"
-JSON output for Well Name: {"Well Name": "9/2-A-4"}

2) Well API Number:
-Attempt to locate the Well API Number. The API number typically has a 10 digit format, but can be extended to 14 digits to include additional details.

Inputs

| Description | Column |
|---|---|
| context | combined_text   » |

606

Examples

| Input:context | Output |
|---|---|
| Completion Report: Well | {"Well Name" : "GSI-13" ,Well API |

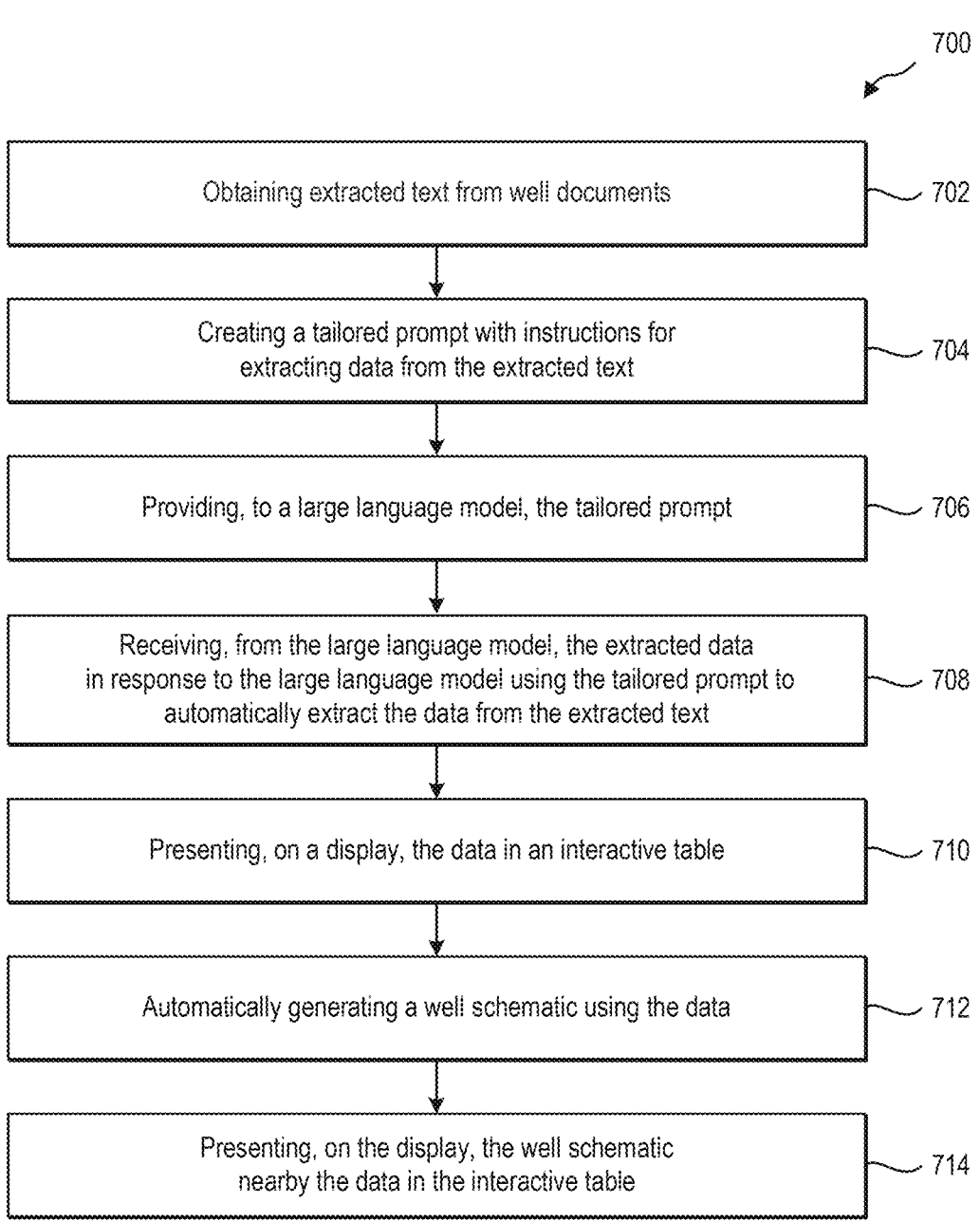

700

Obtaining extracted text from well documents — 702

Creating a tailored prompt with instructions for
extracting data from the extracted text — 704

Providing, to a large language model, the tailored prompt — 706

Receiving, from the large language model, the extracted data
in response to the large language model using the tailored prompt to
automatically extract the data from the extracted text — 708

Presenting, on a display, the data in an interactive table — 710

Automatically generating a well schematic using the data — 712

Presenting, on the display, the well schematic
nearby the data in the interactive table — 714

Memory _803_

Instructions _805_

Data _807_

Processor _801_

Communication
Interface(s) _809_

Input Device(s) _811_

Output Device(s) _813_

Display Device _815_

Display Controller _817_

819

SYSTEMS AND METHODS FOR WELL DOCUMENT EXTRACTION

BACKGROUND OF THE DISCLOSURE

Wellbores are commonly drilled from a surface location or seabed for various exploration and extraction activities. These wellbores are used to access and extract fluid resources like liquid and gaseous hydrocarbons from subterranean formations. The construction of wellbores involves the use of earth-boring equipment such as drill bits for initial drilling and reamers for enlarging the wellbore diameters.

During the plugging and abandonment of oil and gas wells, engineers must analyze well reports, including completion, cementing, and end-of-well documents. These reports are typically unstructured, vary widely in format, and are voluminous, making the extraction of essential wellbore information a challenging and time-intensive task.

SUMMARY

This summary is provided to introduce a selection of concepts that are further described in the detailed description. This summary is not intended to identify key or essential features of the claimed subject matter, nor is it intended to be used as an aid in limiting the scope of the claimed subject matter.

Some implementations relate to a method. The method includes obtaining extracted text from well documents. The method includes creating a tailored prompt with instructions for extracting data from the extracted text. The method includes providing, to a large language model, the tailored prompt. The method includes receiving, from the large language model, the extracted data in response to the large language model using the tailored prompt to automatically extract the data from the extracted text. The method includes presenting, on a display, the data in an interactive table. The method includes automatically generating a well schematic using the data. The method includes presenting, on the display, the well schematic nearby the data in the interactive table.

Some implementations relate to a system. The system includes a memory to store data and instructions; and a processor operable to communicate with the memory, wherein the processor is operable to: obtain extracted text from well documents; create a tailored prompt with instructions for extracting data from the extracted text; provide, to a large language model, the tailored prompt; receive, from the large language model, the extracted data in response to the large language model using the tailored prompt to automatically extract the data from the extracted text; present, on a display, the data in an interactive table; automatically generate a well schematic using the data; and present, on the display, the well schematic nearby the data in the interactive table.

Some implementations relate to a computer-readable storage medium including instructions that, when executed by a processor, cause the processor to: obtain extracted text from well documents; create a tailored prompt with instructions for extracting data from the extracted text; provide, to a large language model, the tailored prompt; receive, from the large language model, the extracted data in response to the large language model using the tailored prompt to automatically extract the data from the extracted text; present, on a display, the data in an interactive table; automatically generate a well schematic using the data; and present, on the display, the well schematic nearby the data in the interactive table.

Additional features and aspects of implementations of the disclosure will be set forth herein, and in part will be obvious from the description, or may be learned by the practice of such implementations. The features and advantages of such implementations may be realized and obtained by means of the instruments and combinations particularly pointed out in the appended claims. These and other features will become more fully apparent from the following description and appended claims, or may be learned by the practice of such implementations as set forth hereinafter.

BRIEF DESCRIPTION OF THE DRAWINGS

In order to describe the manner in which the above-recited and other features of the disclosure can be obtained, a more particular description will be rendered by reference to specific implementations thereof which are illustrated in the appended drawings. For better understanding, the like elements have been designated by like reference numbers throughout the various accompanying figures. While some of the drawings may be schematic or exaggerated representations of concepts, at least some of the drawings may be drawn to scale. Understanding that the drawings depict some example implementations, the implementations will be described and explained with additional specificity and detail through the use of the accompanying drawings in which:

FIGS. 6A and 6B illustrate example GUIs with examples of tailored prompts in accordance with implementations of the present disclosure.

FIG. 7 illustrates an example method for well document extraction in accordance with implementations of the present disclosure.

DETAILED DESCRIPTION

Figure 1:
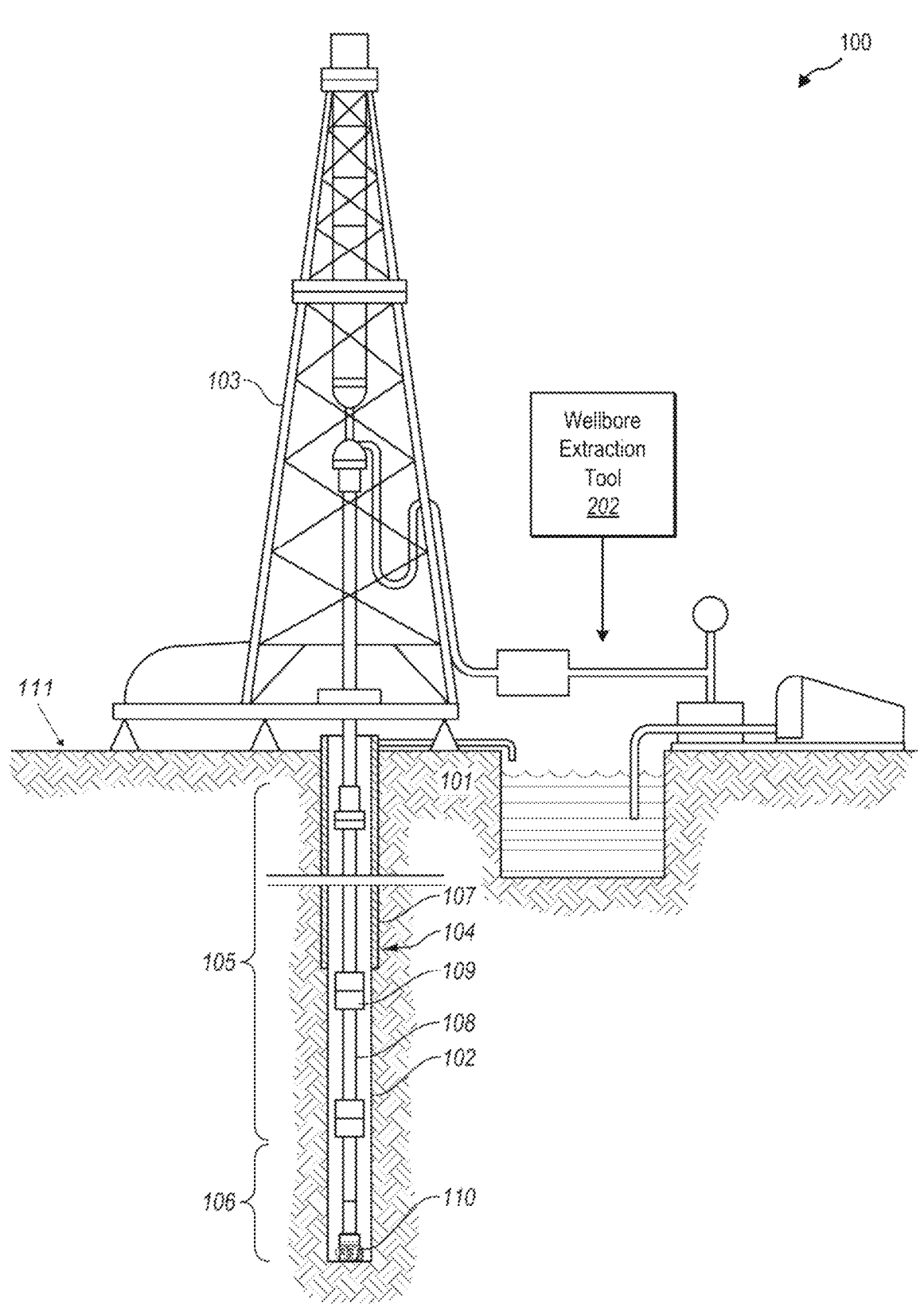
FIG. 1 is an example of a downhole system in accordance with implementations of the present disclosure.

This disclosure generally relates to systems and methods for extracting wellbore parameters from well documents. When plugging an oil and gas well, engineers must sort through well reports such as completions, cementing, end of well reports. These reports are often unstructured, varied in format, and extensive in volume, making the extraction of critical wellbore information a labor-intensive and time-consuming task. Current processes for extracting wellbore parameters from unstructured well reports are labor-intensive, time-consuming, and prone to human error. The manual effort required for data extraction and validation can cause significant delays in the planning and execution of the plugging and abandonment process.

The systems and methods incorporate a wellbore extraction tool designed to automate the retrieval of wellbore parameters, such as casing type, casing size, casing depth, hole size, hole depth, and top of cement from well document. In some implementations, the wellbore extraction tool employs generative artificial intelligence (AI) to efficiently extract key wellbore parameters, such as, casing, hole, and top of cement data. Furthermore, the wellbore extraction tool enables users to submit queries to well reports, facilitating the extraction of additional information. As will be discussed in further detail below, the present disclosure includes a number of practical applications having features described herein that provide benefits and/or solve problems associated with extracting wellbore parameters from well reports. Some example benefits are discussed herein in connection with various features and functionalities provided by a wellbore extraction tool implemented on one or more computing devices. It will be appreciated that benefits explicitly discussed in connection with one or more implementations described herein are provided by way of example and are not intended to be an exhaustive list of all possible benefits of the wellbore extraction tool. For example, one benefit includes streamlining the workflow by automating data extraction, thereby reducing the manual workload, minimizing operational delays, and enhancing data consistency and accuracy. By transforming unstructured data into actionable insights, the systems and methods significantly improve the efficiency of the plugging and abandonment planning process, ultimately reducing costs and optimizing resource utilization.

The systems and methods identify and extract information from the well documents, present the information extracted from the well documents in an interactive table for user validation, and constructs a well schematic for quality control (QC) before the data is sent for further analysis. The systems and methods use generative AI application to automate the extraction and quality control (QC) of wellbore parameters from well documents. Examples of well documents include well reports, such as, completion reports, cementing reports, end-of-well reports, wellbore schematic diagrams, and abandonment reports. It should be appreciated there are other well reports than the examples provided. In some implementations, the well documents are in a portable document format (PDFs). In some implementations, the well documents are images of the well reports.

The systems and methods are designed to convert well documents from unstructured formats such as PDF, PNG, and TIFF into analyzable text. The systems and methods leverage text embedding and segmentation techniques to convert document content into searchable vector embeddings within a vector database. These embeddings facilitate efficient comparison of semantic similarities, enhancing the searchability and analysis of the text helping to identify the chunks of text that are most relevant to the wellbore geometry. After identifying these precise chunks, they are mapped back to their original pages. The entire text of these pages is provided to the Large Language Model (LLM), combining precise data extraction with contextual depth. Tailored prompt engineering is used to guide the LLM to adeptly navigate well reports of different formats and to produce the wellbore parameters in a structured format. The systems and methods present the extracted data in an interactive table for user validation and a well schematic is presented for quality control, ensuring reliability and reducing manual workload. By significantly speeding up data extraction and validation, the systems and methods minimize operational delays and enhance the efficiency of the plugging and abandonment planning process. The systems and methods streamline the plugging and abandonment planning process by automating data extraction, reducing costs and optimizing resource utilization in well operations.

One technical advantage of the systems and methods of the present disclosure is converting unstructured data into a structured format. Another technical advantage of the systems and methods of the present disclosure is speeding up data extraction and validation, minimizing operational delays and enhancing an efficiency of the plugging and abandonment planning process. Another technical advantage of the systems and methods of the present disclosure is automating the extraction of wellbore parameters from unstructured well documents, increasing efficiency in the plugging and abandonment planning process. In some implementations, the systems and methods of the present disclosure use generative AI for automating the extraction of the wellbore parameters from the unstructured well documents. Another technical advantage of the systems and methods is improving data consistency and accuracy by transforming PDF well reports into structured text. The systems and methods utilize tailored prompt engineering to accurately interpret and organize the extracted data. Integration with WELLBARRIER further enhances this process by embedding quality control measures and incorporating visual well schematics. The systems and methods reduce the time required for planning and execution, leading to cost savings and optimized resource utilization. Another technical advantage of the systems and methods of the present disclosure is providing document insights by querying the extracted text for information and providing a source for the information. The systems and methods may augment the well documents with the document insights obtained.

Additional details will now be provided regarding systems described herein in relation to illustrative figures portraying example implementations. For example, FIG. 1 shows one example of a downhole system 100 for drilling an earth formation 101 to form a wellbore 102. The downhole system 100 includes a drill rig 103 used to turn a drilling tool assembly 104 which extends downward into the wellbore 102. The drilling tool assembly 104 may include a drill string 105, a bottomhole assembly ("BHA") 106, and a bit 110, attached to the downhole end of the drill string 105.

The drill string 105 may include several joints of drill pipe 108 connected end-to-end through tool joints 109. The drill string 105 transmits drilling fluid through a central bore and transmits rotational power from the drill rig 103 to the BHA 106. In some implementations, the drill string 105 further includes additional downhole drilling tools and/or components such as subs, pup joints, etc. The drill pipe 108 provides a hydraulic passage through which drilling fluid is pumped from the surface. The drilling fluid discharges through selected-size nozzles, jets, or other orifices in the bit 110 for the purposes of cooling the bit 110 and cutting structures thereon, and for lifting cuttings out of the wellbore 102 as it is being drilled.

The BHA 106 may include the bit 110, other downhole drilling tools, or other components. An example BHA 106 may include additional or other downhole drilling tools or components (e.g., coupled between the drill string 105 and the bit 110). Examples of additional BHA components include drill collars, stabilizers, measurement-while-drilling ("MWD") tools, logging-while-drilling ("LWD") tools, downhole motors, underreamers, section mills, hydraulic disconnects, jars, vibration or dampening tools, other components, or combinations of the foregoing.

In general, the downhole system 100 may include other downhole drilling tools, components, and accessories such as special valves (e.g., kelly cocks, blowout preventers, and safety valves). Additional components included in the downhole system 100 may be considered a part of the drilling tool assembly 104, the drill string 105, or a part of the BHA 106, depending on their locations in the downhole system 100.

The bit 110 in the BHA 106 may be any type of bit suitable for degrading downhole materials. For instance, the bit 110 may be a drill bit suitable for drilling the earth formation 101. Example types of drill bits used for drilling earth formations are fixed-cutter or drag bits. In other implementations, the bit 110 may be a mill used for removing metal, composite, elastomer, other materials downhole, or combinations thereof. For instance, the bit 110 may be used with a whipstock to mill into casing 107 lining the wellbore 102. The bit 110 may also be a junk mill used to mill away tools, plugs, cement, other materials within the wellbore 102, or combinations thereof. Swarf or other cuttings formed by use of a mill may be lifted to the surface 111 or may be allowed to fall downhole. The bit 110 may include one or more cutting elements for degrading the earth formation 101.

The BHA 106 may further include a rotary steerable system (RSS). The RSS may include directional drilling tools that change a direction of the bit 110, and thereby the trajectory of the wellbore. At least a portion of the RSS may maintain a geostationary position relative to an absolute reference frame, such as one or more of gravity, magnetic north, or true north. Using measurements obtained with the geostationary position, the RSS may locate the bit 110, change the course of the bit 110, and direct the directional drilling tools on a projected trajectory. The RSS may steer the bit 110 in accordance with or based on a trajectory for the bit 110. For example, a trajectory may be determined for directing the bit 110 toward one or more subterranean targets such as an oil or gas reservoir.

The downhole system 100 may include or may be associated with a wellbore extraction tool 202. In some implementations, the wellbore extraction tool 202 is on a remote server in communication with the downhole system 100 via a network. The wellbore extraction tool 202 facilitates an automatic workflow for automatically extracting data from well documents associated with the downhole system 100.

Figure 2:
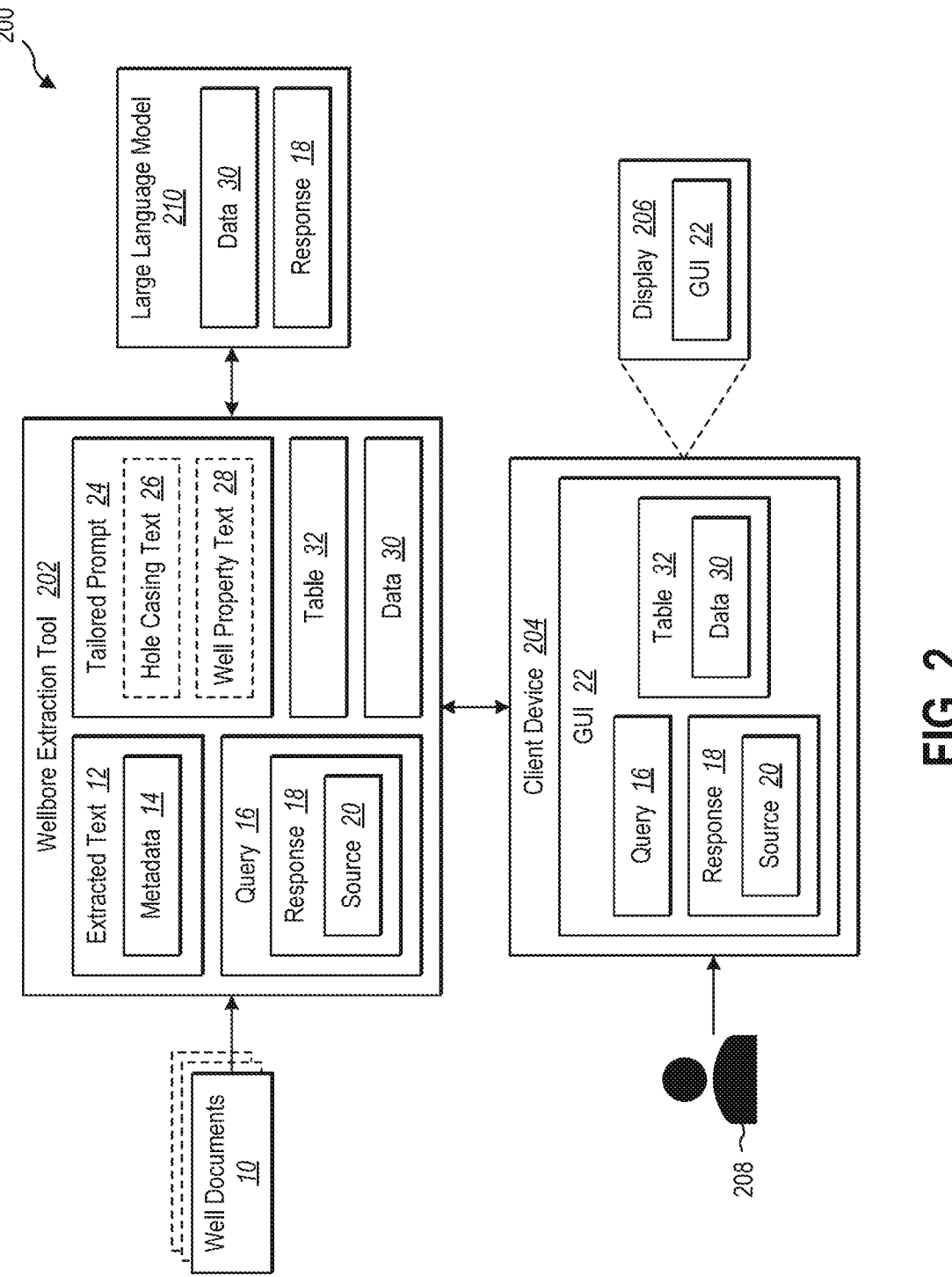
FIG. 2 illustrates an example environment for extracting data from well documents in accordance with implementations of the present disclosure.

FIG. 2 illustrates an example environment 200 for extracting data from well documents. The environment 200 includes a wellbore extraction tool 202 in communication with a client device 204. In some implementations, the wellbore extraction tool 202 is local on the client device 204. In some implementations, the well extraction tool 202 is on a server in communication with the client device 204 through a network. The network may include one or multiple networks and may use one or more communication platforms and/or technologies suitable for transmitting data. The network may refer to any data link that enables transport of electronic data between devices of the environment 200. The network may refer to a hardwired network, a wireless network, or a combination of a hardwired network and a wireless network. In one or more implementations, the network includes the internet. The network may be configured to facilitate communication between the various computing devices via well-site information transfer standard markup language (WITSML) or similar protocol, or any other protocol or form of communication. The server may include one or more computing devices (e.g., including processing units, data storage, etc.) organized in an architecture with various network interfaces for connecting to and providing data management and distribution across one or more client systems.

The client device 204 may be representative of one or multiple client devices and may refer to various types of computing devices. For example, the client device 204 may include a mobile device such as a mobile telephone, a smartphone, a personal digital assistant (PDA), a tablet, a laptop, or any other portable device. Additionally, or alternatively, the client device 204 may include one or more non-mobile devices such as a desktop computer, server device, surface or downhole processor or computer (e.g., associated with a sensor, system, or function of the downhole system), or other non-portable device. In one or more implementations, the client device 204 includes a graphical user interface (GUI) 22 thereon (e.g., a screen of a mobile device). In addition, or as an alternative, one or more of the client devices 204 may be communicatively coupled (e.g., wired or wirelessly) to a display 206 having the GUI 22 thereon for providing a display of system content. The server may similarly refer to various types of computing devices. Each of the devices of the environment 200 may include features and/or functionalities described below in connection with FIG. 8.

In some implementations, the wellbore extraction tool 202 is on a cloud server remote from the client device 204 accessed through the network. The wellbore extraction tool 202 is hosted on virtual machines in the cloud. In some implementations, the wellbore extraction tool 202 is on an edge device. The wellbore extraction tool 202 is accessed via the client device 204. For example, a uniform resource locator (URL) configured to an end point of the wellbore extraction tool 202 is provided to the client device 204 that users 208 may access using a browser on the client device 204. Example users 208 include professionals involved in well operations, such as, a well engineer, geologists, data scientist, or project managers. Another example includes an application on the client device 204 provides access the wellbore extraction tool 202.

The wellbore extraction tool 202 receives well documents 10. In some implementations, the well documents 10 are different well reports associated with the downhole system 100 (FIG. 1). The well documents 10 may include a range of well reports, such as end of well reports, cementing reports, completion reports, well summaries, and well schematics. Typically, these well documents 10 are provided in formats, such as, PDFs or images. Unstructured data within the well documents 10 often includes geological descriptions, drilling parameters (e.g., bit size and drilling speed), logs of drilling fluid properties, time-stamped operator notes, descriptions of potential hazards, and various graphical data such as pressure charts and wellbore schematics. The data in the well documents 10 is not organized in a predefined manner and varies across different documents, presenting complex challenges for data extraction and analysis. In some implementations, the users 208 select the well documents 10 to provide to the wellbore extraction tool 202.

The wellbore extraction tool 202 performs text extraction on the well documents 10 and generates extracted text 12 for each page of the well documents 10. In some implementations, the wellbore extraction tool 202 converts the well documents 10 in a PDF format into text before performing the text extraction on the well documents 10. In some implementations, the wellbore extraction tool 202 converts the well documents 10 that are images into text before performing the text extraction on the well documents 10. In some implementations, the text extraction is automatically performed by the wellbore extraction tool 202 in response to the well documents 10 being provided to the wellbore extraction tool 202.

The extracted text 12 has metadata 14. In some implementations, the extracted text 12 is indexed into a vector database for further processing with the metadata 14. The metadata 14 provides additional information for the extracted text 12 that may be used to provide context to the extracted text 12 and may aid in searching the extracted text 12. One example of the metadata 14 includes a source of the extracted text 12 (e.g., the well document 10 and the page number where the extracted text 12 was obtained). Another example of the metadata 14 is a folder name for the extracted text 12. For example, the folder name provides a context for the extracted text 12.

In some implementations, the wellbore extraction tool 202 uses the metadata 14 for responding to a query 16 provided by the user 208. A query 16 can include any question the user 208 provides to the wellbore extraction tool 202 related to the well or the well documents 10. For example, the user 208 provides the query 16 using a chat feature of the user interface and the wellbore extraction tool 202 provides the query 16 to a large language model (LLM) 210. Examples of the LLM 210 include Generative Pre-trained Transformer (GPT)-4 and Llama2. The LLM 210 searches the extracted text 12 using the metadata 14.

In some implementations, a large language model (LLM) 210 uses the metadata 14 to search the extracted text 12 to provide a response 18 to the query 16. The metadata 14 provides filtering mechanisms to quickly and accurately retrieve the most relevant embeddings for the query 16. The LLM 210 uses the metadata 14 to provide a source 20 of the response 18. For example, the source 20 identifies a well document 10 where the LLM 210 obtained the information to provide the response 18 and/or a page number in the well document 10 that provided the information for the response 18.

The wellbore extraction tool 202 provides the response 18 to the query 16 to the client device 204 for presentation on the GUI 22. The wellbore extraction tool 202 also provides the source 20 information to the client device 204. In some implementations, the source 20 information is displayed nearby the response 18 with a link to the source 20. The user 208 may select the link to the source 20 and the well document 10 associated with the source 20 is presented on the GUI 22 nearby the response 18, allowing the user 208 to easily identify where the LLM 210 obtained the information for the response 18.

In some implementations, the wellbore extraction tool 202 initiates a method by using optical character recognition (OCR) to convert the text from PDF well reports into a digital format. Once the text is extracted, the wellbore extraction tool 202 leverages text embedding and segmentation techniques to transform document content into searchable vector embeddings within a vector database. These embeddings are crucial for facilitating efficient comparison of semantic similarities, significantly enhancing the searchability and analysis of the text. A predefined query is then established, specifically outlining the necessary information on the hole, casing, and top of cement. This query is embedded within the system, and semantic similarity computations are performed to identify chunks of text from the well documents that most closely match the predefined query. After identifying these relevant chunks, they are mapped back to their original pages within the documents. The extracted text 12 from the most relevant pages across all the well documents 10 is compiled and prepared for further processing by the large language model 210.

The wellbore extraction tool 202 generates a tailored prompt 24 to provide to the LLM 210 with instructions for extracting data 30 from the extracted text 12. In some implementations, the data 30 is wellbore parameters of a well. In some implementations, the instructions provide dictionary information to the LLM 210 to use in extracting the data 30. In some implementations, the instructions provide definitions to the LLM 210 to use in extracting the data 30. In some implementations, the instructions provide abbreviations or variations on terms that the LLM 210 can use in inferring the data 30.

In some implementations, the tailored prompt 24 provides detailed instructions to the LLM 210 for extracting hole casing and top of cement information. The tailored prompt 24 provides specific instructions for the LLM 210 to extract the hole depth, hole size, casing type, casing size, casing depth, and top of cement information from the extracted text 12. The tailored prompt 24 is used by the LLM 210 to automatically identify and extract the data 30 in response to the instructions provided in the tailored prompt 24. In some implementations, the LLM 210 infers the data 30 from the extracted text 12 using the instructions provided in the tailored prompt 24.

In some implementations, the instructions provide for each casing interval the casing size, a start depth, and end depth. In some implementations, the instructions provide different sizes for the casing size. For example, the instructions provide common industry standards for the casing size that the LLM 210 may use for identifying the casing size or inferring the casing size from the extracted text 12. In some implementations, the instructions provide options for the casing type (e.g., conductor, second conductor, surface casing, intermediate casing, drilling liner, production casing, production liner, open hole, or tieback) for the LLM 210 to use in identifying the casing type. In some implementations, the instructions provide common industry standards for the hole size that the LLM 210 may use to infer the hole size if the hole size is not provided in the extracted text 12.

In some implementations, the instructions provide limits for the data 30. For example, the instructions may instruct the LLM 210 to ensure that the hole depth is equal to or greater than the corresponding casing depth. Another example of a limit includes a minimum size for the value (e.g., a minimum casing size is four inches). Another example of a limit is a maximum depth for a hole size.

In some implementations, the instructions provide default values for the data 30. For example, the instructions may instruct the LLM 210 to provide a value of not available if the LLM 210 is unable to locate the value in the extracted text 12 or unable to infer the value from the extracted text 12 using the instructions included in the tailored prompt 24. Another example includes the instructions may instruct the LLM 210 to provide a value of zero as the default value. For example, if the top of casing is not listed, use the value zero as the default casing start depth. Another example includes the instructions may instruct the LLM 210 to provide a value of open as the default value if the data 30 is not present in the extracted text 12.

In some implementations, the extracted text 12 is limited to the hole casing text 26 (the extracted text 12 identified as being related to the casing) and the hole casing text 26 is provided with the tailored prompt 24 to the LLM 210 and the LLM 210 extracts the hole casing and top of cement information from the hole casing text 26. Limiting the extracted text 12 to the hole casing text 26 reduces the information that the LLM 210 processes during the automated extraction of the data 30.

In some implementations, the tailored prompt 24 is for the well property text 28 (the extracted text 12 identified as being related to the well properties) and the tailored prompt 24 provides instructions to the LLM 210 for extracting well property information from the extracted text 12. The tailored prompt 24 provides specific instructions for the LLM 210 to extract the well name, the well American Petroleum Institute (API) number, the well UWI (unique well identifier), the well location, and the field (e.g., geological formation or operation area) where drilling operations are conducted from the extracted text 12. The tailored prompt 24 is used by the LLM 210 to automatically identify and extract the data 30 in response to the instructions provided in the tailored prompt 24. In some implementations, the LLM 210 infers the data 30 from the extracted text 12 using the instructions provided in the tailored prompt 24.

In some implementations, the instructions provide default values for the data 30. For example, the instructions may instruct the LLM 210 to provide a value of not available if the LLM 210 is unable to identify the value (e.g., the well name, the well API number, or the well UWI) in the extracted text 12. In some implementations, the instructions provide formatting instructions for the geographic coordinates of the well location.

In some implementations, the extracted text 12 is limited to the well property text 28 (the extracted text 12 identified as being related to the well properties) and the well property text 28 is provided with the tailored prompt 24 to the LLM 210 and the LLM 210 extracts the well property information from the well property text 28. Limiting the extracted text 12 to the well property text 28 reduces the information that the LLM 210 processes during the automated extraction of the data 30.

In some implementations, the instructions for the tailored prompt 24 are provided by the user 208 using the GUI 22. For example, the GUI 22 provides the user 208 with options for selecting a type of LLM to use (e.g., GPT-3, GPT-4, or LLaMA). Another example includes the GUI 22 providing an area for the user 208 to provide the instructions for the tailored prompt 24. Another example includes the GUI 22 providing an area for the user 208 to provide examples to the LLM 210 for the LLM 210 to use in learning how to extract the data 30. Another example includes the GUI 22 providing different settings for the user 208 to select for the LLM 210 (e.g., parameters governing the randomness of responses by the LLM 210, the maximum output tokens provided by the LLM 210).

The tailored prompt 24 provides the LLM 210 with directions for how to identify the data 30 in the extracted text 12 and what text is commonly associated with the data 30. The tailored prompt 24 also provides the LLM 210 with examples and information to use in inferring the data 30 if the LLM 210 is unable to locate the data 30 in the extracted text 12. The tailored prompt 24 provides the LLM 210 with precise data interpretation and structuring, enhancing data accuracy and consistency.

The LLM 210 provides an output with the data 30 to the wellbore extraction tool 202. In some implementations, the instructions in the tailored prompt 24 provide specifications for the output of the data 30. The LLM 210 extracts the data 30 from the extracted text 12 using the instructions provided in the tailored prompt 24 and provides the data 30 in the format specified in the instructions for the output of the data 30. Specifying the instructions for the output ensures that the data 30 is in a consistent format and ensures that the output is repeatable by the LLM 210. The LLM 210 provides the data 30 to the wellbore extraction tool 202.

In some implementations, the output is a table 32 with the data 30 and the LLM 210 provides the table 32 with the data 30 extracted in response to the tailored prompt 24. The wellbore extraction tool 202 provides the table 32 with the data 30 to the client device 204 for displaying on the GUI 22. The user 208 may view the table 32 with the data 30 on the display 206.

In some implementations, a well schematic is presented nearby the table 32. The well schematic is automatically generated and presented on the display 206 using the data 30 in the table 32. In some implementations, the well schematic is presented by integrating WELLBARRIER. In some implementations, the well schematic is presented by integrating other applications. The well schematic is an automatically generated visual representation of the well, displayed on the display 206 using the data 30 from the table 32. The schematic models the wellbore's architecture comprehensively, including casing layers, their dimensions, depths, hole sizes, and specifically the cemented intervals at various sections of the well, as detailed in the table. The schematic serves to illustrate the structural and spatial relationships of various well components, including the cemented intervals if such information is available. The schematic enhances understanding and planning capabilities by providing a clear visual representation of the entire well structure. Additionally, the table 32 is interactive, allowing the users 208 to modify the data 30. The modifications dynamically update the well schematic in real time. The user 208 may perform quality control on the data 30 before the data 30 is sent for further analysis or processing. In some implementations, the data 30 is sent to WELLBARRIER for further analysis and processing, for example, by the user 208 clicking on a send button in the GUI 22.

The wellbore extraction tool 202 automates the data extraction from the different well documents 10, thereby reducing the manual workload, minimizing operational delays, and enhancing data consistency and accuracy. The wellbore extraction tool 202 transforms the unstructured data in the well documents 10 into actionable insights improving the efficiency of the plugging and abandonment planning process, reducing costs and optimizing resource utilization.

In some implementations, one or more computing devices (e.g., servers and/or devices) are used to perform the processing of the environments 200. The one or more computing devices may include, but are not limited to, server devices, cloud virtual machines, personal computers, a mobile device, such as, a mobile telephone, a smartphone, a PDA, a tablet, or a laptop, and/or a non-mobile device. The features and functionalities discussed herein in connection with the various systems may be implemented on one computing device or across multiple computing devices. For example, the wellbore extraction tool 202 and the large language model 210 are implemented on a single computing device. Moreover, in some implementations, one or more subcomponent of the feature and functionalities discussed herein may be implemented are processed on different server devices of the same or different cloud computing networks. For example, the wellbore extraction tool 202 and the large language model 210 are implemented on different server devices. In this way, the environment 200 may be a cloud computing environment, and the wellbore extraction tool 202 and/or the large language model 210 may be implemented across one or more devices of the cloud computing environment in order to leverage the processing capabilities, memory capabilities, connectivity, speed, etc., that such cloud computing environments offer in order to facilitate the features and functionalities described herein.

In some implementations, each of the components of the environment 200 is in communication with each other using any suitable communication technologies. In addition, while the components of the environment 200 are shown to be separate, any of the components or subcomponents may be combined into fewer components, such as into a single component, or divided into more components as may serve a particular implementation. In some implementations, the components of the environment 200 include hardware, software, or both. For example, the components of the environment 200 may include one or more instructions stored on a computer-readable storage medium and executable by processors of one or more computing devices. When executed by the one or more processors, the computer-executable instructions of one or more computing devices can perform one or more methods described herein. In some implementations, the components of the environment 200 include hardware, such as a special purpose processing device to perform a certain function or group of functions. In some implementations, the components of the environment 200 include a combination of computer-executable instructions and hardware.

Figure 3:
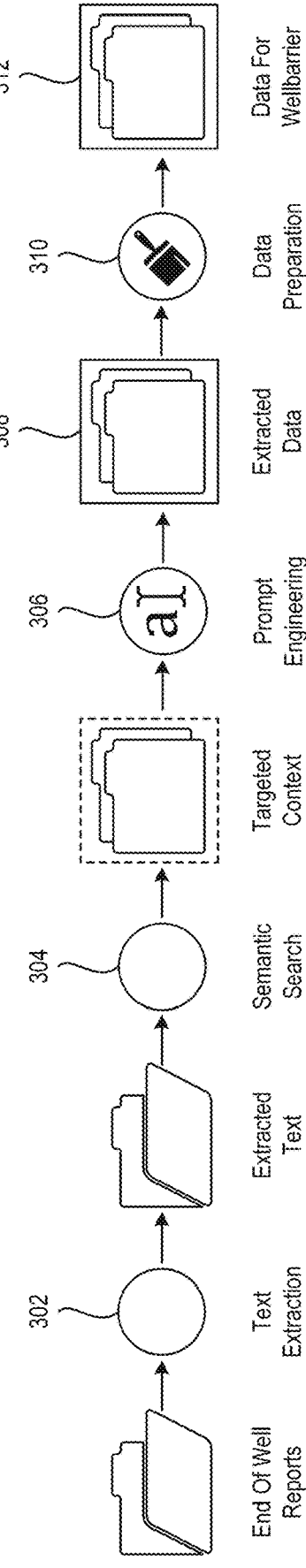
FIG. 3 illustrates an example method for well document extraction in accordance with implementations of the present disclosure.

FIG. 3 illustrates a method 300 for well document extraction. The actions of the method 300 are discussed below in reference to the architecture of FIGS. 1 and 2.

At 302, the method 300 includes performing text extraction on well documents. The wellbore extraction tool 202 receives the well documents 10 and extracts the text from the well documents 10. In some implementations, the well documents 10 are in a PDF format and the wellbore extraction tool 202 converts the PDFs into text. In some implementations, the well documents 10 are images and the wellbore extraction tool 202 converts the images into text. The wellbore extraction tool 202 extracts the text from each of the well documents 10.

At 304, the method 300 includes performing a semantic search on the extracted text. The wellbore extraction tool 202 performs a semantic search on the extracted text 12 and identifies metadata 14 associated with the extracted text 12. The metadata 14 provides additional information for the extracted text 12 that may be used to provide context to the extracted text 12 and may aid in searching the extracted text 12. One example of the metadata 14 includes a source of the extracted text 12 (e.g., the well document 10 and the page number where the extracted text 12 was obtained). Another example of the metadata 14 is a folder name for the extracted text 12. For example, the folder name provides a context for the extracted text 12. In some implementations, the wellbore extraction tool 202 places the extracted text 12 into an index with a vector database with the metadata 14.

The wellbore extraction tool 202 optionally generates targeted context of the extracted text 12. In some implementations, the wellbore extraction tool 202 uses the semantic search to identify the extracted text 12 related to a context of hole casing and groups the hole casing text 26 together in a folder. In some implementations, the wellbore extraction tool 202 uses the semantic search to identify the extracted text 12 related to a context of well properties and groups the well property text 28 together in a folder.

At 306, the method 300 includes creating a tailored prompt to provide to a LLM to automatically extract data from the extracted text 12. The wellbore extraction tool 202 generates a tailored prompt 24 to provide to the LLM 210 with instructions for extracting the data 30 from the extracted text 12. The tailored prompt 24 provides the LLM 210 with directions for how to identify the data 30 in the extracted text 12 and what text is commonly associated with the data 30. The tailored prompt 24 also provides the LLM 210 with examples and information to use in inferring the data 30 if the LLM 210 is unable to locate the data 30 in the extracted text 12. The tailored prompt 24 provides the LLM 210 with precise data interpretation and structuring, enhancing data accuracy and consistency.

In some implementations, the tailored prompt 24 provides detailed instructions to the LLM 210 for extracting hole casing and top of cement information. The tailored prompt 24 provides specific instructions for the LLM 210 to extract the hole depth, hole size, casing type, casing size, casing depth, and top of cement information from the extracted text 12.

In some implementations, the tailored prompt 24 is for the well property text 28 and the tailored prompt 24 provides instructions to the LLM 210 for extracting well property information from the extracted text 12. The tailored prompt 24 provides specific instructions for the LLM 210 to extract the well name, the well API number, the well UWI (unique well identifier), the well location, and the field (e.g., geological formation or operation area) where drilling operations are conducted from the extracted text 12.

At 308, the method 300 includes receiving, from the LLM in response to the tailored prompt, data extracted from the extracted text. The LLM 210 provides the data 30 to the wellbore extraction tool 202 in response to the tailored prompt 24. In some implementations, the instructions in the tailored prompt 24 provide specifications for the output of the data 30. The LLM 210 extracts the data 30 from the extracted text 12 using the instructions provided in the tailored prompt 24 and provides the data 30 in the format specified in the instructions for the output of the data 30. The LLM 210 provides the data 30 to the wellbore extraction tool 202.

In some implementations, the LLM 210 joins the data 30 extracted in response to the tailored prompt 24 for extracting hole casing and top of cement information and the data 30 extracted in response to the tailored prompt 24 for extracting the well property text 28 together and provides the data 30 joined together to the wellbore extraction tool 202.

In some implementations, the wellbore extraction tool 202 performs verifications on the data 30 extracted by the LLM 210 to prevent errors in the data 30. The wellbore extraction tool 202 may perform a quality control of the data 30 ensuring that the values for the data 30 are within industry standards and limits. For example, during the quality control the wellbore extraction tool 202 ensures that the casing depth value is not the same as the top of cement value. Another example includes during the quality control the wellbore extraction tool 202 ensures that the top of cement is not larger than the casing. The wellbore extraction tool 202 updates the data 30 in response to any errors identified during the quality control process.

At 310, the method 300 includes preparing the data. The wellbore extraction tool 202 prepares the data 30 for presenting on the display 206. In some implementations, the output is a table 32 with the data 30 and the LLM 210 provides the table 32 with the data 30 extracted in response to the tailored prompt 24. The wellbore extraction tool 202 provides the table 32 with the data 30 to the client device 204 for displaying on the GUI 22. The user 208 may view the table 32 with the data 30 on the display 206.

In some implementations, the wellbore extraction tool 202 prepares the data 30 for further processing by creating a well object with the data 30 extracted for a well. For example, the well object includes a country where the well is located, the well name, a wellhead type, the field name, units of measurement and the hole casing information that was automatically extracted for the well.

At 312, the method 300 includes sending the data for further processing. In some implementations, the wellbore extraction tool 202 sends the data 30 to other applications for further processing or analysis. For example, the wellbore extraction tool 202 sends the well object to WELLBAR-RIER for further processing or analysis.

The method 300 automatically identifies and extracts the data 30 from the well documents 10 and constructs a well schematic for quality control (QC) before the data 30 is sent for further analysis. The method 300 uses tailored prompt engineering for the LLM 210 to interpret and extract the data 30 from the text of the well documents 10.

Figure 4A:
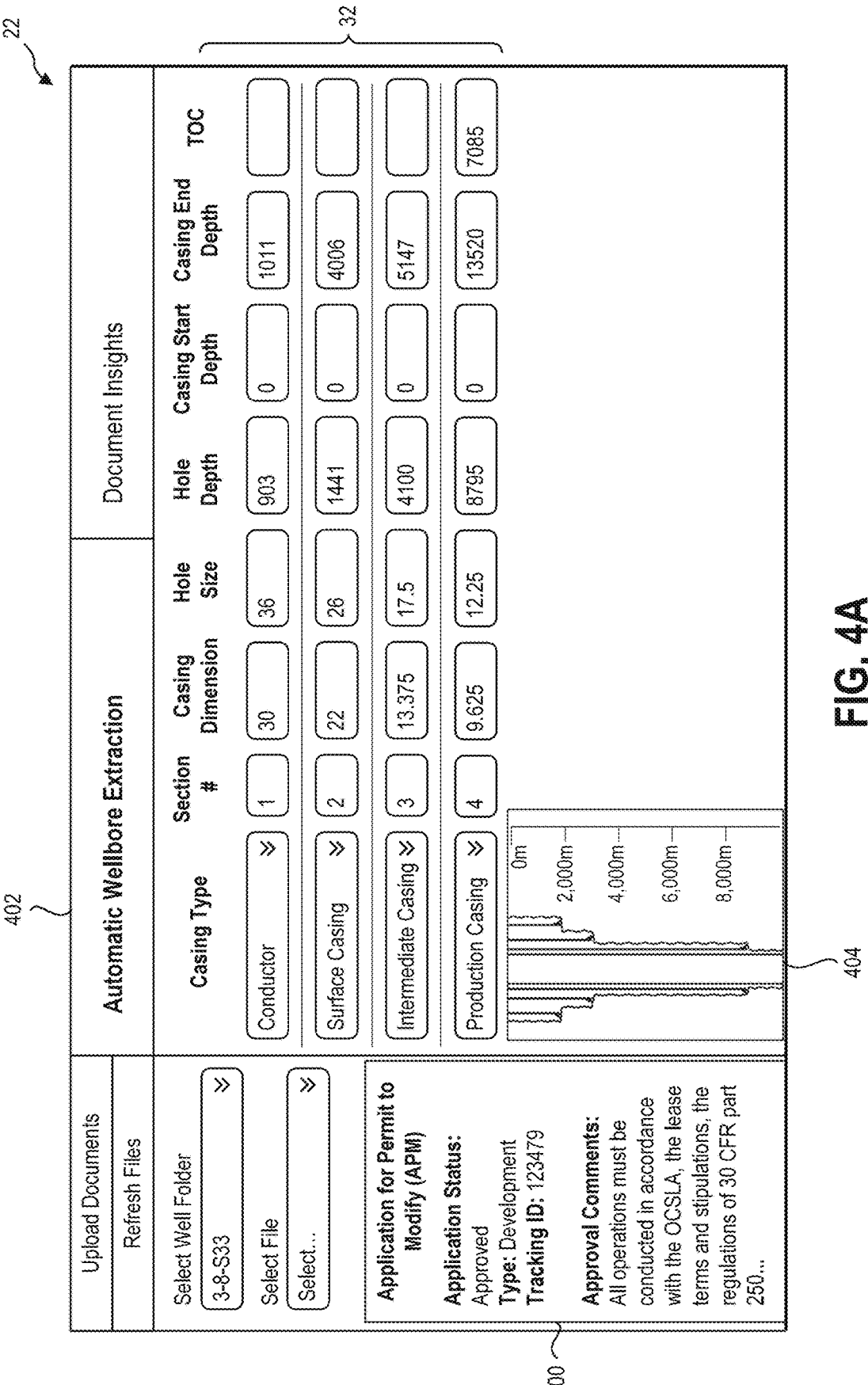
FIGS. 4A-4D illustrate example graphical user interfaces (GUIs) with the data extracted from well documents in accordance with implementations of the present disclosure.

FIG. 4A illustrates an example GUI 22 presented with the data 30 (FIG. 2) extracted from the well documents 10. The GUI 22 includes a tab 402 for automatic wellbore extraction. In some implementations, the wellbore extraction tool 202 (FIG. 2) provides the data 30 to the client device 204 (FIG. 2) for presentation on the display 206 (FIG. 2) in response to the user 208 (FIG. 2) selecting the tab 402. The user 208 selecting the tab 402 may trigger the wellbore extraction tool 202 to automatically extract the data 30 from the well documents 10 and send the data 30 for presentation on the GUI 22.

The GUI 22 presents a table 32 with the data 30 (e.g., the values for the different items presented in the 32) extracted from the well documents 10. The GUI 22 presents a well schematic 404 using the data 30 extracted from the well documents 10. The well schematic 404 is generated using the values of the table 32 and an image of the well schematic 404 is rendered on the GUI 22.

In some implementations, the GUI 22 presents the well documents 10 where the data 30 was obtained from nearby the table 32 so the user 208 may easily verify the data 30 in the table 32. In some implementations, the table 32 is an interactive table that allows the user 208 to modify for change the values presented in the table 32. For example, the user 208 may modify the values for the surface casing.

Figure 4B:
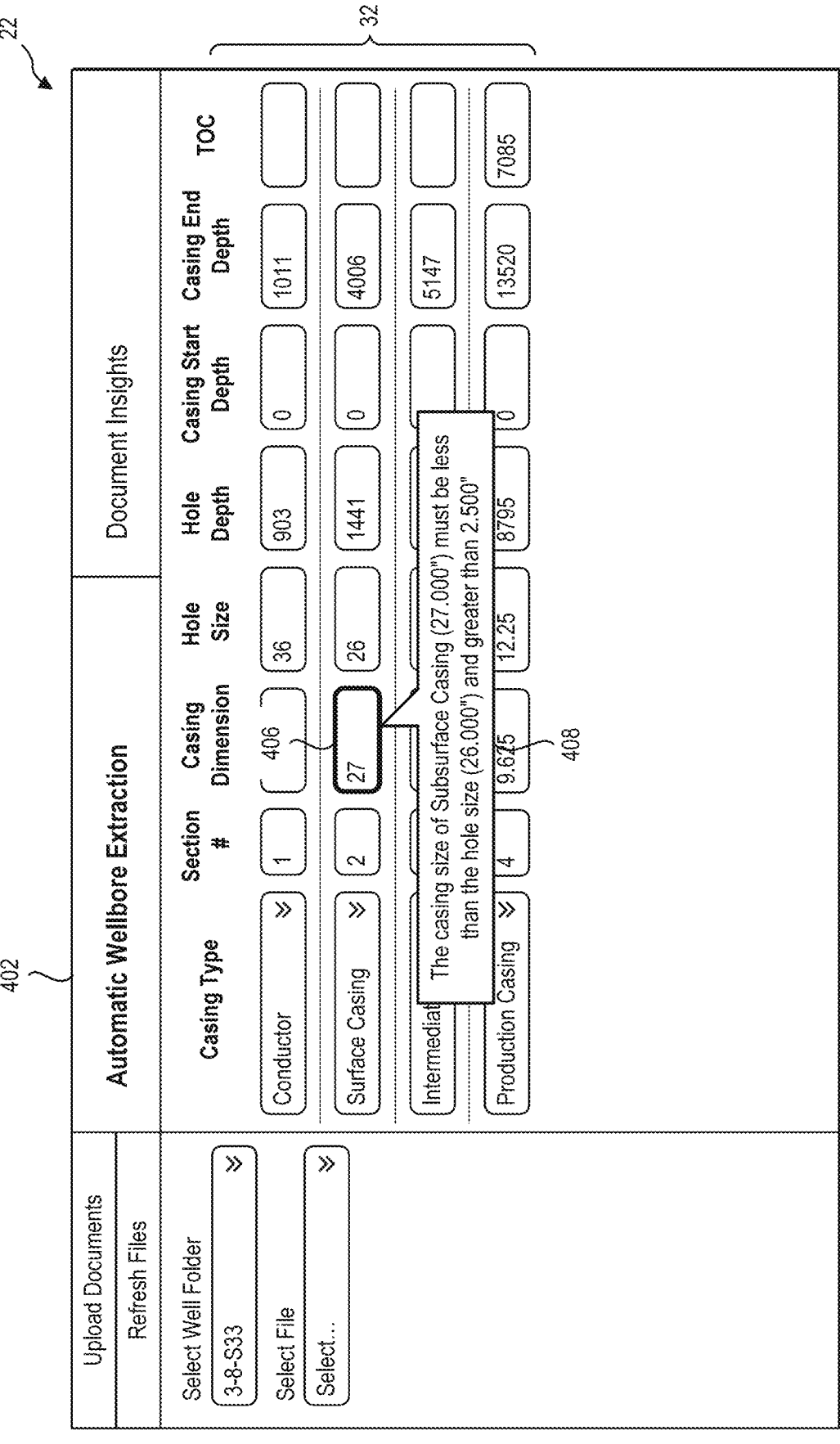

FIG. 4B illustrates an example GUI 22 where the value 406 of the casing dimension is modified. For example, the user 208 modifies the value 406 of the casing dimension from 20 (the data 30 automatically extracted by the LLM 210 from the well document 10 presented in FIG. 4A) to 27. The GUI 22 presents an error message 408 in response to the modification indicating that the value 27 is causes an error. The wellbore extraction tool 202 may provide quality control on the values included in the table 32 to ensure that the values comply with industry standards and to prevent inaccurate data from populating in the table 32.

Figure 4C:
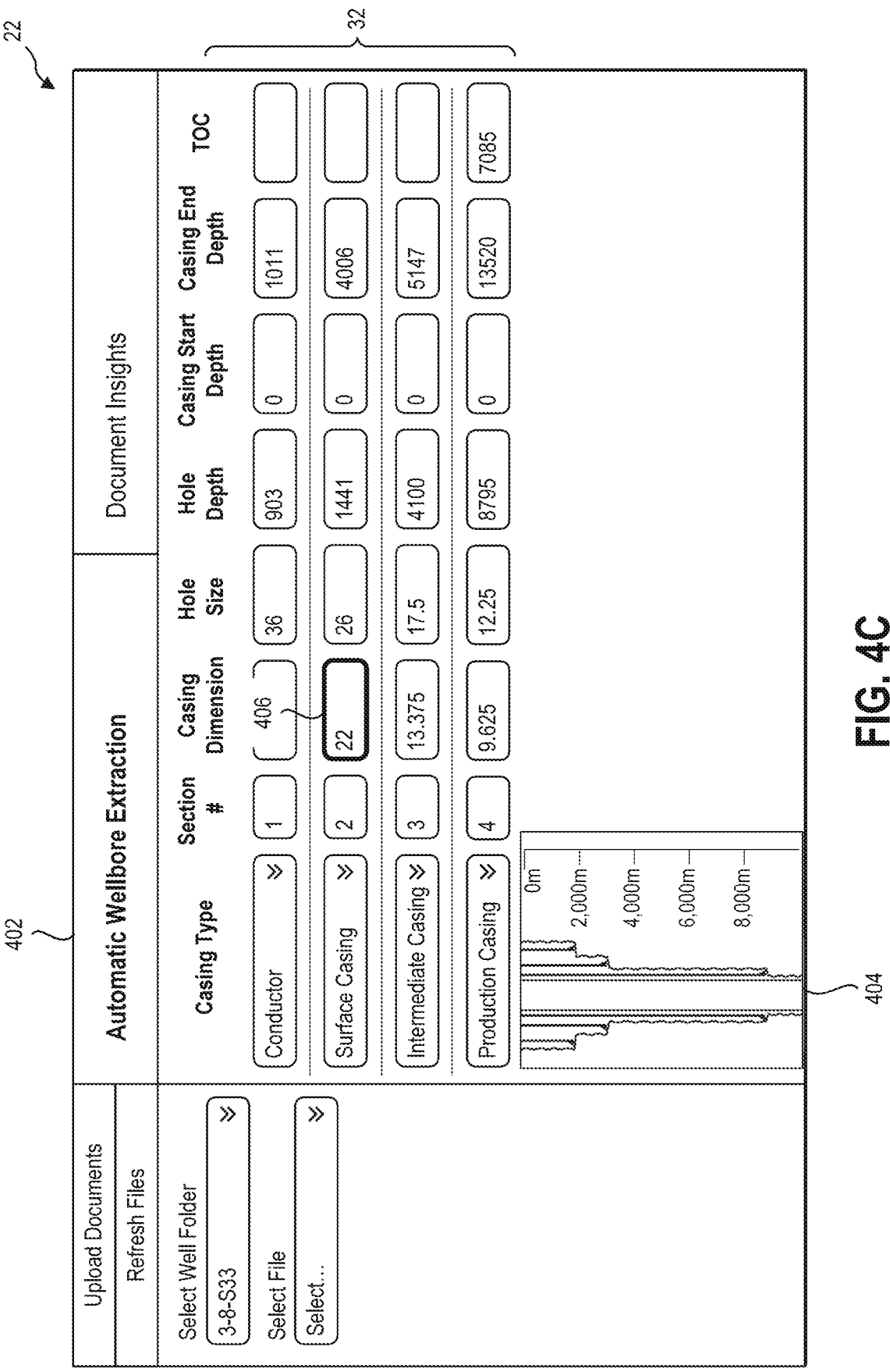

FIG. 4C illustrates an example GUI 22 where the value 406 of the casing dimension is modified. For example, the user 208 modifies the value 406 of the casing dimension from 20 (the data 30 automatically extracted by the LLM 210 from the well document 10 presented in FIG. 4A) to 22. The GUI 22 automatically updates the well schematic 404 displayed with the new value for the casing dimension. Any modifications or changes to the data 30 may be displayed on the fly in the well schematic 404. The user 208 may easily view the changes to the well using the well schematic 404.

Figure 4D:
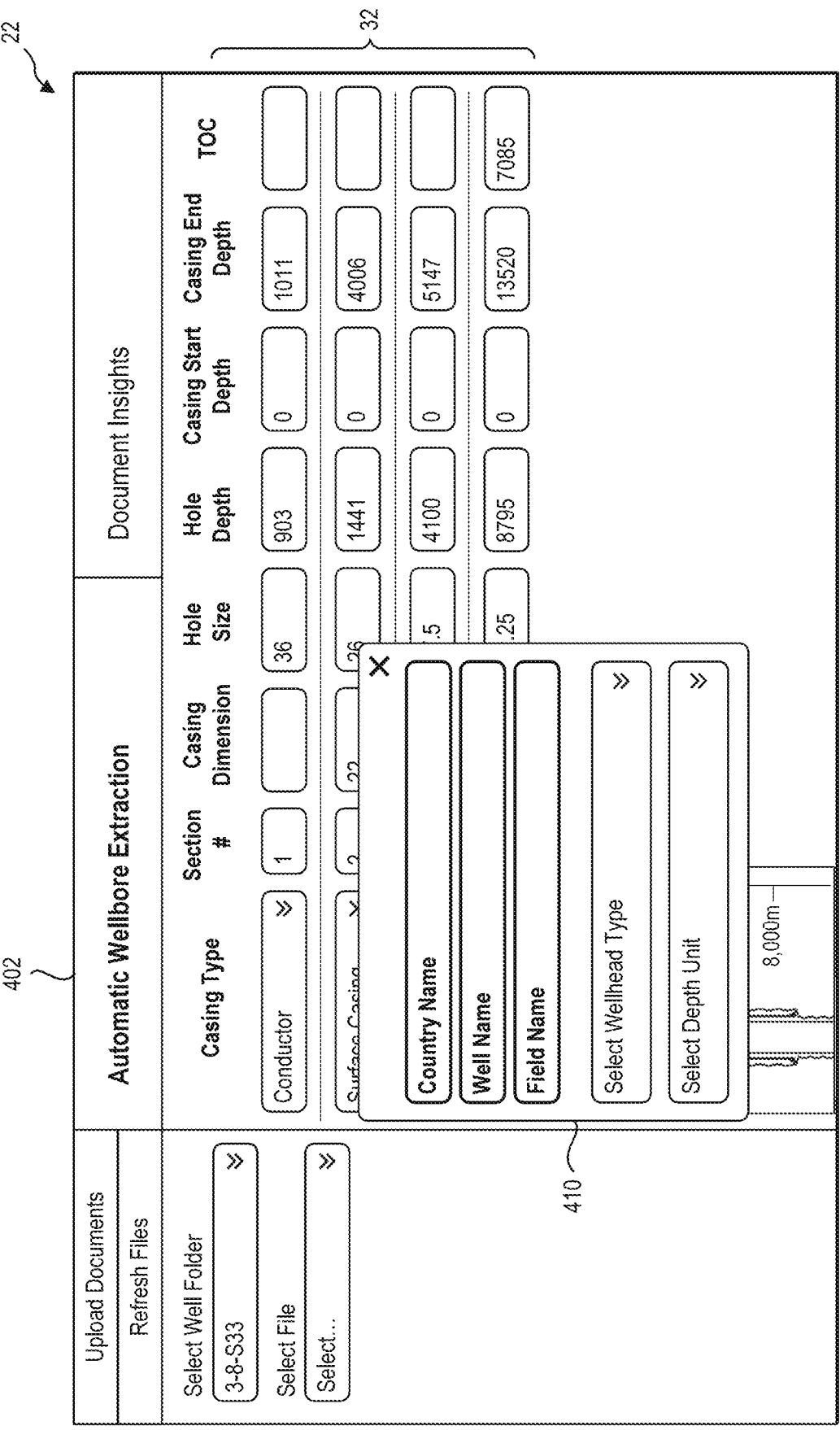

FIG. 4D illustrates an example GUI 22 of creating a well object 410 for the data 30 in the table 32. The well object 410 includes the country name, the well name, the field name, a selected wellhead type, and the selected depth unit. The well object 410 contains the data 30 automatically extracted from the well documents 10 by the LLM 210. In some implementations, the well object is created in the country identified and the data 30 is accessible for further processing and/or querying.

Figure 5A:
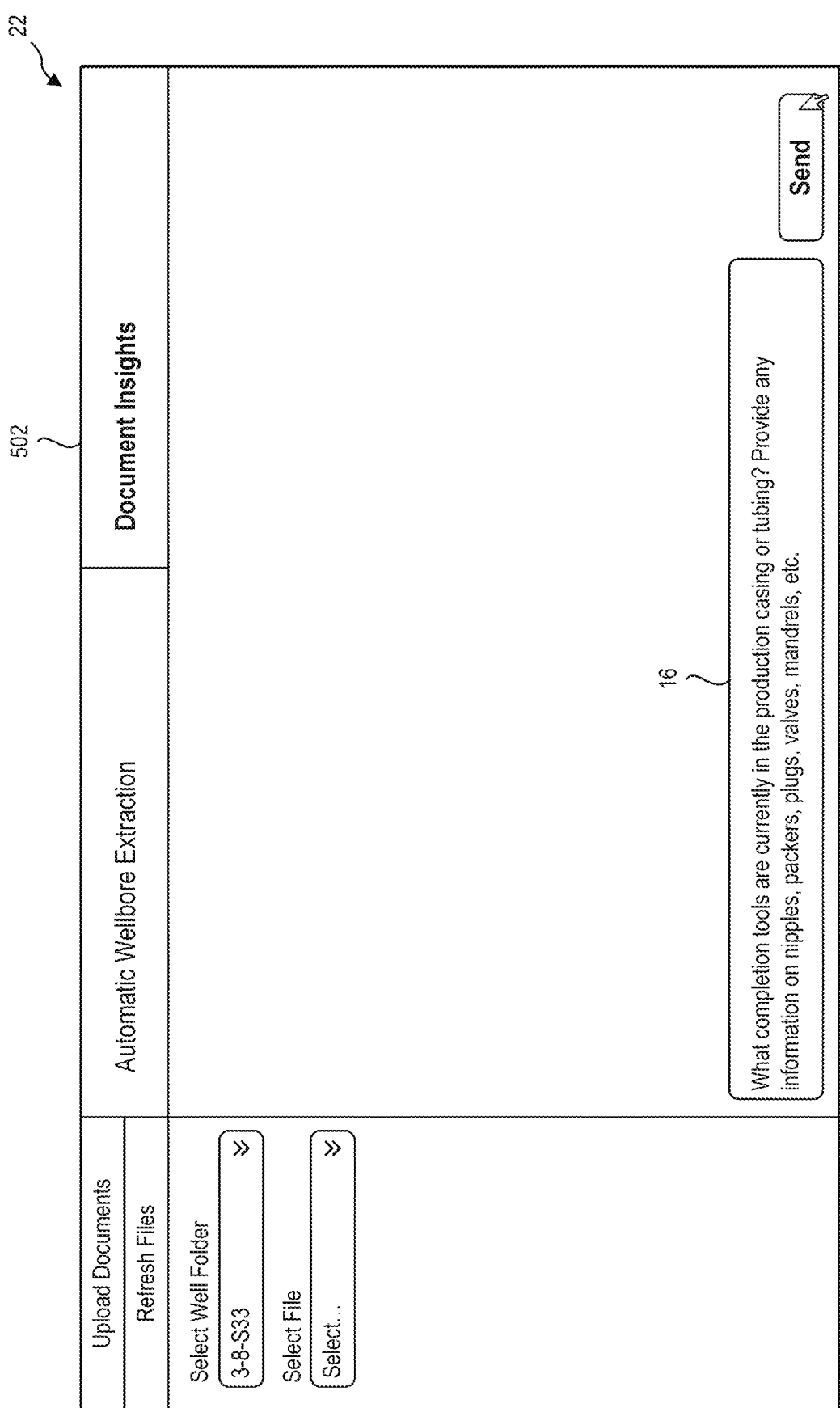
FIGS. 5A and 5B illustrate example GUIs with document insights in accordance with implementations of the present disclosure.

FIG. 5A illustrates an example GUI 22 with document insights presented in response to a query 16. The GUI 22 includes a document insight tab 502 that the user 208 (FIG. 2) may select to provide a query 16. The wellbore extraction tool 202 (FIG. 2) provides the query 16 to the LLM 210 (FIG. 2) and receives the response 18 (FIG. 2) from the LLM 210 to the query 16. The wellbore extraction tool 202 provides the response 18 to the client device 204 (FIG. 2) for presentation on the display 206 (FIG. 2). The document insight tab 502 allows the user 208 to engage in real-time natural language based communication with the LLM 210 through the wellbore extraction tool 202. The query 16 can include any question the user 208 provides to the wellbore extraction tool 202 related to the well or the well documents 10.

Figure 5B:
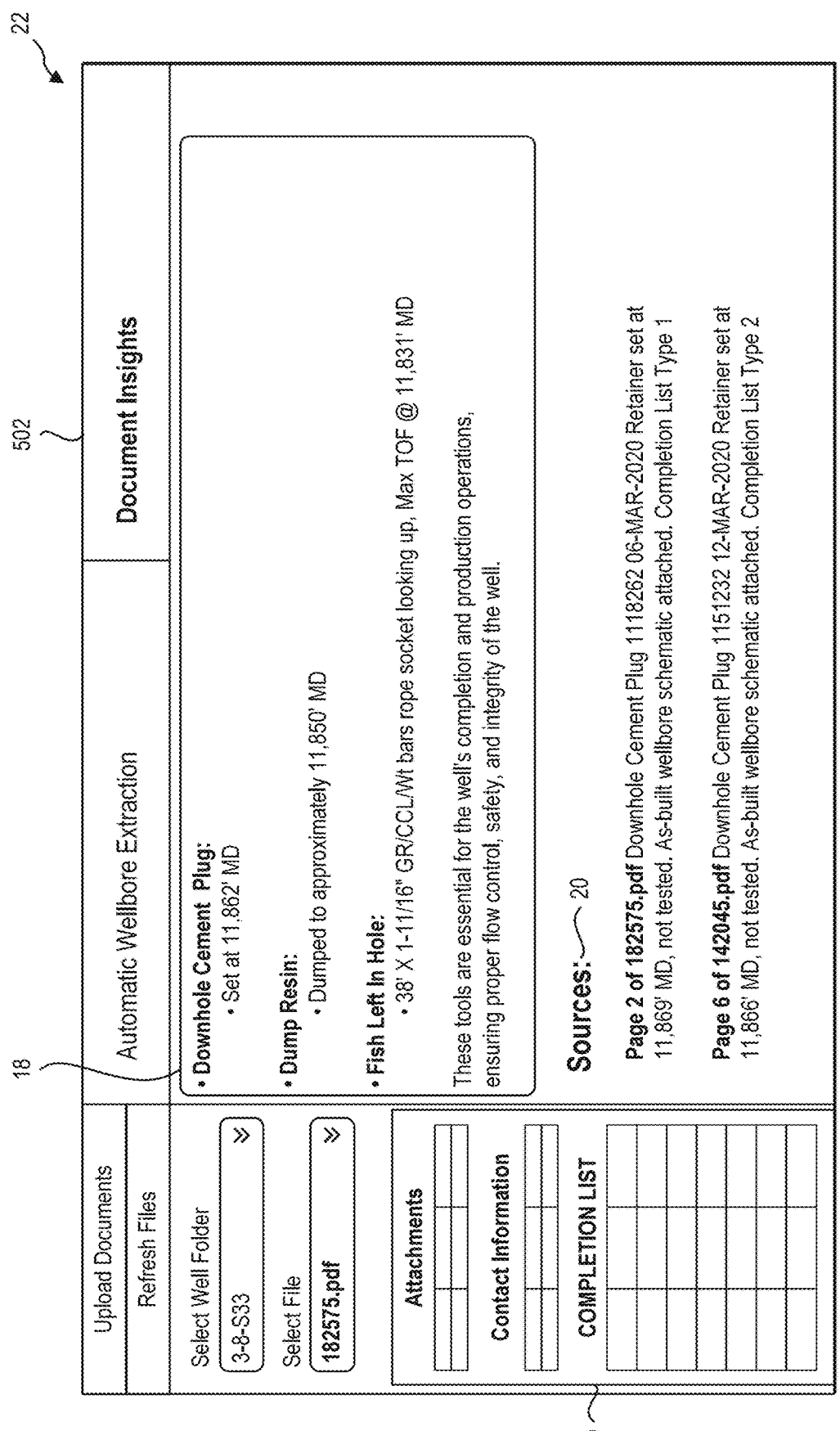

FIG. 5B illustrates an example GUI 22 with the response 18 to the query 16 presented. In some implementations, the LLM 210 uses the metadata 14 (FIG. 2) of the extracted text 12 (FIG. 2) of the well documents 10 to search the extracted text 12 for the response 18. The metadata 14 provides filtering mechanisms to quickly and accurately retrieve the most relevant embeddings from the extracted text 12 for the query 16. The LLM 210 also uses the metadata 14 to provide a source 20 for the response 18. For example, the source 20 identifies a well document 10 where the LLM 210 obtained the information to provide the response 18 and/or a page number in the well document 10 that provided the information for the response 18.

In some implementations, the GUI 22 displays the well document 10 associated with the source 20. For example, the user 208 selects a link to the source 20 and the well document 10 associated with the source 20 is presented in the GUI 22 allowing the user 208 to easily identify where the LLM 210 obtained the information for the response 18.

Figure 6A:
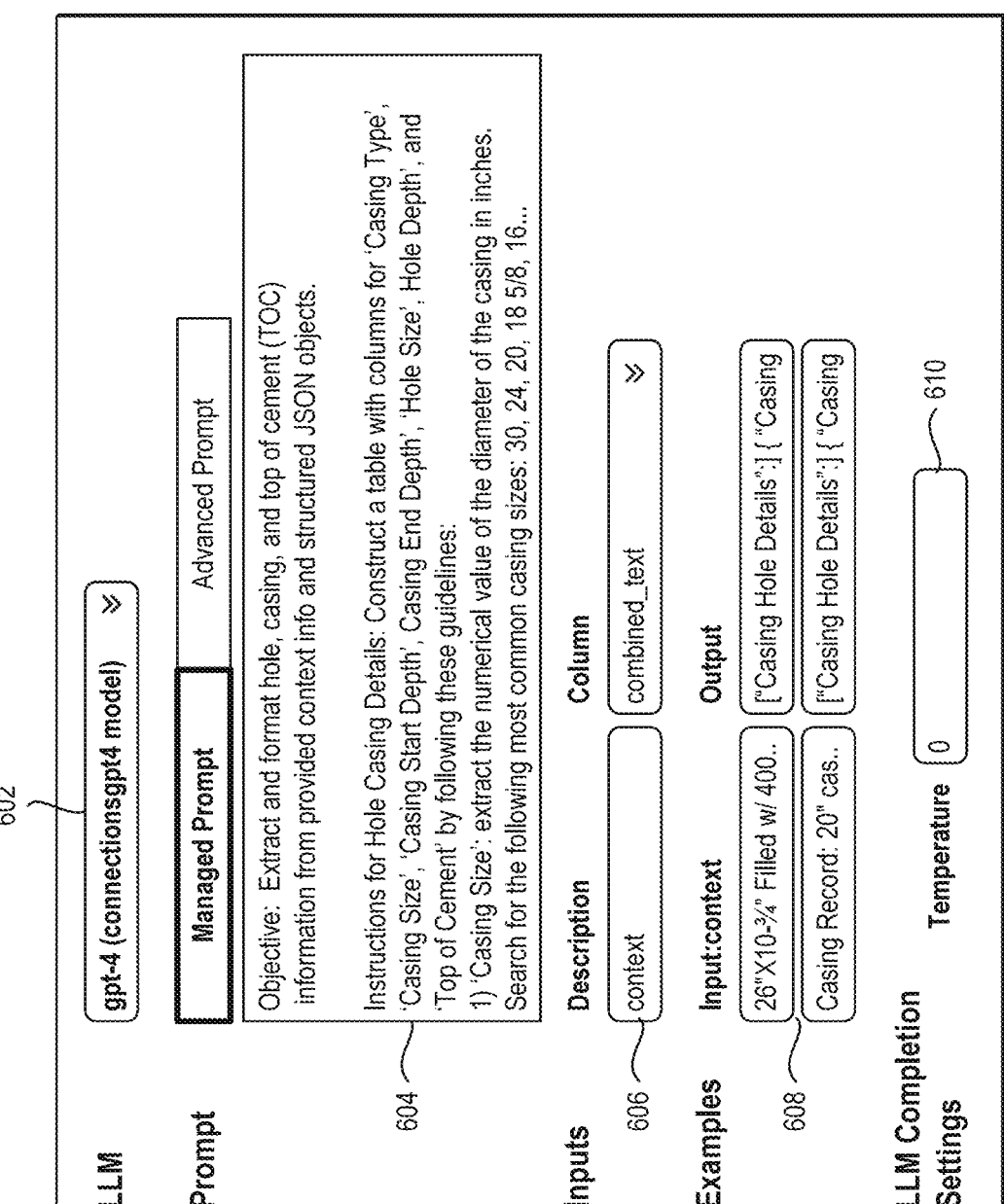

FIGS. 6A and 6B illustrate example GUIs 22 for creating a tailored prompt 24 (FIG. 2). The tailored prompt 24 is provided by the wellbore extraction tool 202 to the LLM 210 to use in extracting the data 30 from the extracted text 12 (FIG. 2) of the well documents 10 (FIG. 2). The tailored prompt 24 provides the LLM 210 with directions for how to identify the data 30 in the extracted text 12 and what text is commonly associated with the data 30. The tailored prompt 24 also provides the LLM 210 with examples and information to use in inferring the data 30 if the LLM 210 is unable to locate the data 30 in the extracted text 12. The tailored prompt 24 provides the LLM 210 with precise data interpretation and structuring, enhancing data accuracy and consistency.

In some implementations, the instructions for the tailored prompt 24 are provided by the user 208 using the GUI 22. For example, the GUI 22 provides the user 208 with options for selecting a type 602 of LLM to use (e.g., GPT-3, GPT-4, or LLaMA). Another example includes the GUI 22 providing an area 604 for the user 208 to provide the instructions for the tailored prompt 24. Another example includes the GUI 22 providing an area 606 for the user 208 to provide different inputs to the LLM 210. Another example includes the GUI 22 providing an area 608 for the user 208 to provide examples to the LLM 210 for the LLM 210 to use in learning how to extract the data 30. Another example includes the GUI 22 providing different settings 610 for the user 208 to select for the LLM 210 (e.g., parameters governing the randomness of responses by the LLM 210, the maximum output tokens provided by the LLM 210). FIG. 6A illustrates an example tailored prompt 24 for hole casings and top of cement information. FIG. 6B illustrates an example tailored prompt 24 for well properties.

FIG. 7 illustrates an example method 700 for well document extraction. The actions of the method 700 are discussed below in reference to FIGS. 1-6B.

At 702, the method 700 includes obtaining extracted text from well documents. The wellbore extraction tool 202 receives the well documents 10 and extracts the text from the well documents 10. In some implementations, the well documents 10 are in a PDF format and the wellbore extraction tool 202 converts the PDFs into text. In some implementations, the well documents 10 are images and the wellbore extraction tool 202 converts the images into text. The wellbore extraction tool 202 extracts the text from each of the well documents 10. The text is then embedded to convert document content into searchable vector embeddings within a vector database. The embeddings facilitate efficient comparison of semantic similarities, enhancing the searchability and analysis of the text helping to identify the chunks of text that are most relevant to the wellbore geometry. After identifying these precise chunks, the chunks are mapped back to their original pages. The entire text of these isolated pages is then provided to the LLM.

At 704, the method 700 includes creating a tailored prompt with instructions for extracting data from the extracted text. The wellbore extraction tool 202 creates the tailored prompt 24 with instructions for extracting the data 30 from the extracted text 12. The tailored prompt 24 provides the LLM 210 with directions for how to identify the data 30 in the extracted text 12 and what text is commonly associated with the data 30. The tailored prompt 24 also provides the LLM 210 with examples and information to use in inferring the data 30 if the LLM 210 is unable to locate the data 30 in the extracted text 12.

At 706, the method 700 includes providing, to a large language model, the tailored prompt. The wellbore extraction tool 202 provides to the LLM 210 the tailored prompt 24. The tailored prompt 24 provides the LLM 210 with precise data interpretation and structuring, enhancing data accuracy and consistency.

At 708, the method 700 includes receiving, from the large language model, the extracted data in response to the large language model using the tailored prompt to automatically extract the data from the extracted text. The wellbore extraction tool 202 receives from the LLM 210 the data 30 extracted in response to the LLM 210 using the tailored prompt 24 to automatically extract the data 30 from the extracted text 12.

In some implementations, the tailored prompt 24 includes an objective to obtain hole casing and top of cement information from the well documents, settings for the large language model, and instructions for the LLM 210 to use in extracting hole casing details, inputs, examples. The instructions for extracting hole casing details include guidelines for casing size, casing start depth, casing end depth, casing type, hole size, hole depth, top of cement, cross-reference information, and output specifications. In some implementations, the LLM 210 uses the instructions to automatically extract the data 30 from the extracted text 12. In some implementations, the LLM 210 uses the instructions to automatically infer the data 30 from the extracted text 12.

In some implementations, the tailored prompt 24 includes an objective to obtain well property data from the well documents, sample inputs, examples for the LLM, settings for the large language model, and instructions for the LLM to use in extracting well property data. The instructions for extracting well property data include well name instructions, well API number instructions, a UWI instructions, and field extraction instructions. The LLM 210 uses the instructions in the tailored prompt 24 to automatically extract the data 30 from the extracted text 12.

At 710, the method 700 includes presenting, on a display, the data in an interactive table. The wellbore extraction tool 202 presents on the display 206 the data 30 in an interactive table (e.g., the table 32). The user 208 may change any of the values for the data 30 in the interactive table.

At 712, the method 700 includes automatically generating a well schematic using the data. The wellbore extraction tool 202 automatically generates a well schematic 404 using the data 30 in the table 32. The well schematic renders a model of the well using the data 30 in the table 32 for wellbore parameters of the well.

At 714, the method 700 includes presenting, on the display, the well schematic nearby the data in the interactive table. The wellbore extraction tool 202 presents on the display 206 the well schematic 404 nearby the data 30 in an interactive table (e.g., the table 32). In some implementations, the user 208 uses the well schematic 404 to perform quality control on the data 30 in the interactive table. In some implementations, the data 30 in the table 32 is used for comparative analysis for well design optimization. The well schematic 404 and the extracted parameters are used to optimize well design in future operations by understanding patterns and variations in wellbore configurations helping to identify designs that lead to successful outcomes and spot inefficiencies and risk. The well schematic 404 and the extracted parameters may be used to influence the construction of wells in future operations.

In some implementations, the wellbore extraction tool 202 receives updated data in the interactive table and the wellbore extraction tool 202 automatically generates a modified well schematic using the updated data. The wellbore extraction tool 202 presents, on the display 206, the modified well schematic. In some implementations, the wellbore extraction tool 202 performs quality control on the updated data and presents an error message 408 in response to the quality control determining the updated data violates an industry standard or a limit of the value.

The method 700 optionally includes receiving a query 16 for the well documents 10; providing, by the LLM 210, a response 18 to the query 16 using the extracted text 12; and presenting, on the display 206, the response 18 to the query 16 and a citation to a source 20 for the response 18. The method 700 optionally includes receiving a selection of the citation and displaying a well document 10 corresponding to the source 20 nearby the response 18.

The method 700 identifies and extracts data from the well documents, presents the data in an interactive table for user validation, and constructs a well schematic for quality control (QC). The method 700 minimizes operational delays and enhances the efficiency of the plugging and abandonment planning process by automatically performing the data extraction.

Figure 8:
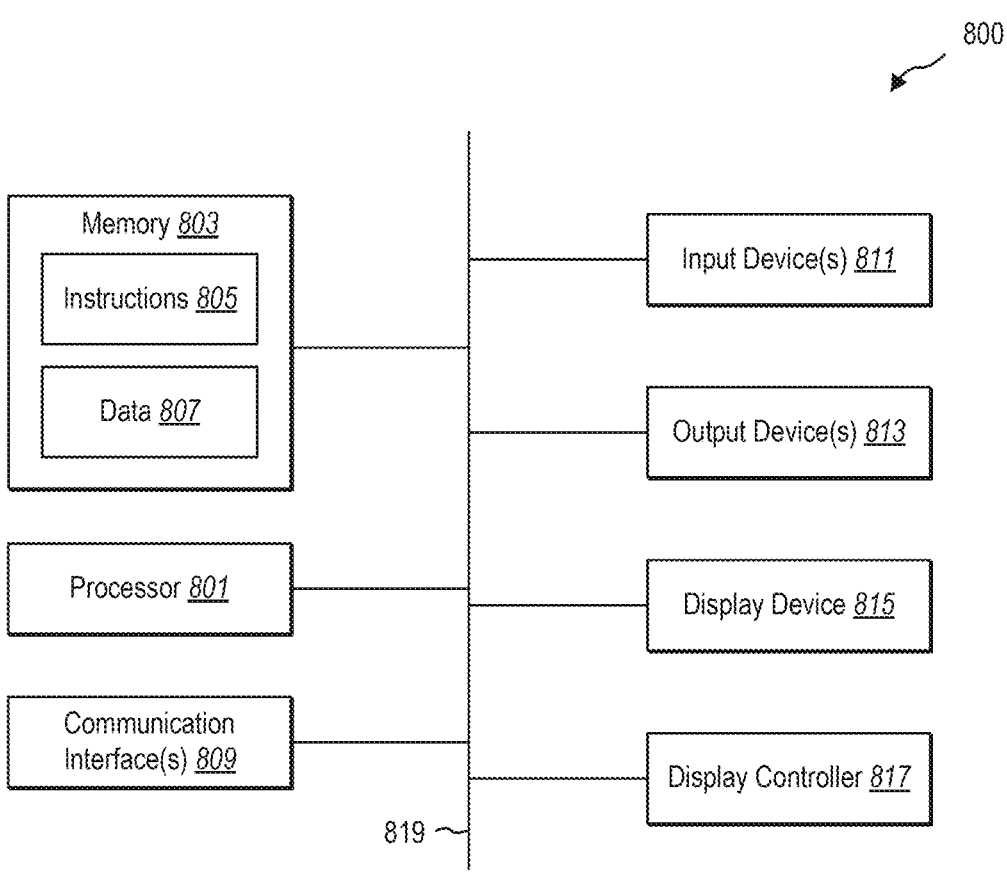
FIG. 8 illustrates components that may be included within a computer system.

Turning now to FIG. 8, this figure illustrates certain components that may be included within a computer system 800. One or more computer systems 800 may be used to implement the various devices, components, and systems described herein.

The computer system 800 includes a processor 801. The processor 801 may be a general-purpose single- or multichip microprocessor (e.g., an Advanced RISC (Reduced Instruction Set Computer) Machine (ARM)), a special purpose microprocessor (e.g., a digital signal processor (DSP)), a microcontroller, a programmable gate array, etc. The processor 801 may be referred to as a central processing unit (CPU). Although just a single processor 801 is shown in the computer system 800 of FIG. 8, in an alternative configuration, a combination of processors (e.g., an ARM and DSP) could be used.

The computer system 800 also includes memory 803 in electronic communication with the processor 801. The memory 803 may include computer-readable storage media and can be any available media that can be accessed by a general purpose or special purpose computer system. Computer-readable media that store computer-executable instructions are non-transitory computer-readable media (device). Computer-readable media that carry computer-executable instructions are transmission media. Thus, by way of example and not limitations, implementation of the present disclosure can comprise at least two distinctly different kinds of computer-readable media: non-transitory computer-readable media (devices) and transmission media.

Both non-transitory computer-readable media (devices) and transmission media may be used temporarily to store or carry software instructions in the form of computer readable program code that allows performance of implementations of the present disclosure. Non-transitory computer-readable media may further be used to persistently or permanently store such software instructions. Examples of non-transitory computer-readable storage media include physical memory (e.g., RAM, ROM, EPROM, EEPROM, etc.), optical disk storage (e.g., CD, DVD, HDDVD, Blu-ray, etc.), storage devices (e.g., magnetic disk storage, tape storage, diskette, etc.), flash or other solid-state storage or memory, or any other non-transmission medium which can be used to store program code in the form of computer-executable instructions or data structures and which can be accessed by a general purpose or special purpose computer, whether such program code is stored or in software, hardware, firmware, or combinations thereof.

Instructions 805 and data 807 may be stored in the memory 803. The instructions 805 may be executable by the processor 801 to implement some or all of the functionality disclosed herein. Executing the instructions 805 may involve the use of the data 807 that is stored in the memory 803. Any of the various examples of modules and components described herein may be implemented, partially or wholly, as instructions 805 stored in memory 803 and executed by the processor 801. Any of the various examples of data described herein may be among the data 807 that is stored in memory 803 and used during execution of the instructions 805 by the processor 801.

A computer system 800 may also include one or more communication interfaces 809 for communicating with other electronic devices. The communication interface(s) 809 may be based on wired communication technology, wireless communication technology, or both. Some examples of communication interfaces 809 include a Universal Serial Bus (USB), an Ethernet adapter, a wireless adapter that operates in accordance with an Institute of Electrical and Electronics Engineers (IEEE) 802.11 wireless communication protocol, a Bluetooth® wireless communication adapter, and an infrared (IR) communication port.

The communication interfaces 809 may connect the computer system 800 to a network. A "network" or "communications network" may generally be defined as one or more data links that enable the transport of electronic data between computer systems and/or modules, engines, or other electronic devices, or combinations thereof. When information is transferred or provided over a communication network or another communications connection (either hardwired, wireless, or a combination of hardwired or wireless) to a computing device, the computing device properly views the connection as a transmission medium. Transmission media can include a communication network and/or data links, carrier waves, wireless signals, and the like, which can be used to carry desired program or template code means or instructions in the form of computer-executable instruction or data structures and which can be accessed by a general purpose or special purpose computer.

A computer system 800 may also include one or more input devices 811 and one or more output devices 813. Some examples of input devices 811 include a keyboard, mouse, microphone, remote control device, button, joystick, trackball, touchpad, and lightpen. Some examples of output devices 813 include a speaker and a printer. One specific type of output device that is typically included in a computer system 800 is a display device 815. Display devices 815 used with implementations disclosed herein may utilize any suitable image projection technology, such as liquid crystal display (LCD), light-emitting diode (LED), gas plasma, electroluminescence, or the like. A display controller 817 may also be provided, for converting data 807 stored in the memory 803 into one or more of text, graphics, or moving images (as appropriate) shown on the display device 815.

The various components of the computer system 800 may be coupled together by one or more buses, which may include one or more of a power bus, a control signal bus, a status signal bus, a data bus, other similar components, or combinations thereof. For the sake of clarity, the various buses are illustrated in FIG. 8 as a bus system 819.

As illustrated in the foregoing discussion, the present disclosure utilizes a variety of terms to describe features and advantages of the model evaluation system. Additional detail is now provided regarding the meaning of such terms. For example, as used herein, a "machine learning model" refers to a computer algorithm or model (e.g., a classification model, a clustering model, a regression model, a language model, an object detection model, a probabilistic graphical model) that can be tuned (e.g., trained) based on training input to approximate unknown functions. For example, a machine learning model may refer to a neural network (e.g., a convolutional neural network (CNN), deep neural network (DNN), recurrent neural network (RNN)), or other machine learning algorithm or architecture that learns and approximates complex functions and generates outputs based on a plurality of inputs provided to the machine learning model. As used herein, a "machine learning system" may refer to one or multiple machine learning models that cooperatively generate one or more outputs based on corresponding inputs. For example, a machine learning system may refer to any system architecture having multiple discrete machine learning components that consider different kinds of information or inputs.

The techniques described herein may be implemented in hardware, software, firmware, or any combination thereof, unless specifically described as being implemented in a specific manner. Any features described as modules, components, or the like may also be implemented together in an integrated logic device or separately as discrete but interoperable logic devices. If implemented in software, the techniques may be realized at least in part by a non-transitory processor-readable storage medium comprising instructions that, when executed by at least one processor, perform one or more of the methods described herein. The instructions may be organized into routines, programs, objects, components, data structures, etc., which may perform particular tasks and/or implement particular data types, and which may be combined or distributed as desired in various implementations.

Further, upon reaching various computer system components, program code in the form of computer-executable instructions or data structures can be transferred automatically or manually from transmission media to non-transitory computer-readable storage media (or vice versa). For example, computer executable instructions or data structures received over a network or data link can be buffered in memory (e.g., RAM) within a network interface module (NIC), and then eventually transferred to computer system RAM and/or to less volatile non-transitory computer-readable storage media at a computer system. Thus, it should be understood that non-transitory computer-readable storage media can be included in computer system components that also (or even primarily) utilize transmission media.

INDUSTRIAL APPLICABILITY

The description from the preceding paragraphs of the DETAILED DESCRIPTION includes various implementations that, where feasible, may be combined in any permutation. For example, the implementation of the preceding paragraphs of the DETAILED DESCRIPTION may be combined with any or all implementations of the following paragraphs. Implementations that describe acts of a method may be combined with implementations that describe, for example, systems and/or devices. Any permutation of the following paragraphs is considered to be hereby disclosed for the purposes of providing "unambiguously derivable support" for any claim amendment based on the following paragraphs. Furthermore, the following paragraphs provide support such that any combination of the following paragraphs would not create an "intermediate generalization."

In some implementations, a method includes obtaining extracted text from well documents. The method includes creating a tailored prompt with instructions for extracting data from the extracted text. The method includes providing, to a large language model, the tailored prompt. The method includes receiving, from the large language model, the extracted data, wherein the large language model uses the tailored prompt to automatically extract the data from the extracted text. The method includes presenting, on a display, the data in an interactive table. The method includes automatically generating a well schematic using the data. The method includes presenting, on the display, the well schematic nearby the data in the interactive table.

In some implementations, the method includes the tailored prompt including an objective to obtain hole casing and top of cement information from the well documents, settings for the large language model, and instructions for the LLM to use in extracting hole casing details, inputs, examples.

In some implementations, the method includes the instructions for extracting hole casing details include guidelines for casing size, casing start depth, casing end depth, casing type, hole size, hole depth, top of cement, cross-reference information, and output specifications; and the large language model uses the instructions to automatically extract the data from the extracted text.

In some implementations, the method includes the large language model uses the instructions to automatically infer the data from the extracted text.

In some implementations, the method includes the tailored prompt including an objective to obtain well property data from the well documents, sample inputs, examples for the LLM, settings for the large language model, and instructions for the LLM to use in extracting well property data.

In some implementations, the method includes the instructions for extracting well property data include well name instructions, well API number instructions, unique well identifier (UWI) instructions, and field extraction instructions; and the large language model uses the instructions to automatically extract the data from the extracted text.

In some implementations, the method includes receiving updated data in the interactive table; automatically generating a modified well schematic using the updated data; and presenting, on the display, the modified well schematic.

In some implementations, the method includes performing quality control on the updated data; and presenting, on the display, an error message in response to the quality control determining the updated data violates an industry standard or a limit of the value.

In some implementations, the method includes receiving a query for the well documents; providing, by the large language model, a response to the query using the extracted text; and presenting, on the display, the response to the query and a citation to a source for the response.

In some implementations, the method includes receiving a selection of the citation; and displaying a well document corresponding to the source nearby the response.

In some implementations, the system includes a memory to store data and instructions; and a processor operable to communicate with the memory, wherein the processor is operable to: obtain extracted text from well documents; create a tailored prompt with instructions for extracting data from the extracted text; provide, to a large language model, the tailored prompt; receive, from the large language model, the extracted data, wherein the large language model uses the tailored prompt to automatically extract the data from the extracted text; present, on a display, the data in an interactive table; automatically generate a well schematic using the data; and present, on the display, the well schematic nearby the data in the interactive table.

In some implementations, a computer-readable storage medium including instructions that, when executed by a processor, cause the processor to: obtain extracted text from well documents; create a tailored prompt with instructions for extracting data from the extracted text; provide, to a large language model, the tailored prompt; receive, from the large language model, the extracted data, wherein the large language model uses the tailored prompt to automatically extract the data from the extracted text; present, on a display, the data in an interactive table; automatically generate a well schematic using the data; and present, on the display, the well schematic nearby the data in the interactive table.

The implementations of the wellbore extraction tool have been primarily described with reference to wellbore drilling operations; the wellbore extraction tool described herein may be used in applications other than the drilling of a wellbore. In other implementations, the wellbore extraction tool according to the present disclosure may be used outside a wellbore or other downhole environment used for the exploration or production of natural resources. For instance, the wellbore extraction tool of the present disclosure may be used in a borehole used for placement of utility lines. Accordingly, the terms "wellbore," "borehole" and the like should not be interpreted to limit tools, systems, assemblies, or methods of the present disclosure to any particular industry, field, or environment.

One or more specific implementations of the present disclosure are described herein. These described implementations are examples of the presently disclosed techniques. Additionally, in an effort to provide a concise description of these implementations, not all features of an actual implementation may be described in the specification. It should be appreciated that in the development of any such actual implementation, as in any engineering or design project, numerous implementation-specific decisions will be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Additionally, it should be understood that references to "one implementation" or "an implementation" of the present disclosure are not intended to be interpreted as excluding the existence of additional implementations that also incorporate the recited features. For example, any element described in relation to an implementation herein may be combinable with any element of any other implementation described herein. Numbers, percentages, ratios, or other values stated herein are intended to include that value, and also other values that are "about" or "approximately" the stated value, as would be appreciated by one of ordinary skill in the art encompassed by implementations of the present disclosure. A stated value should therefore be interpreted broadly enough to encompass values that are at least close enough to the stated value to perform a desired function or achieve a desired result. The stated values include at least the variation to be expected in a suitable manufacturing or production process, and may include values that are within 5%, within 1%, within 0.1%, or within 0.01% of a stated value.

A person having ordinary skill in the art should realize in view of the present disclosure that equivalent constructions do not depart from the spirit and scope of the present disclosure, and that various changes, substitutions, and alterations may be made to implementations disclosed herein without departing from the spirit and scope of the present disclosure. Equivalent constructions, including functional "means-plus-function" clauses are intended to cover the structures described herein as performing the recited function, including both structural equivalents that operate in the same manner, and equivalent structures that provide the same function. It is the express intention of the applicant not to invoke means-plus-function or other functional claiming for any claim except for those in which the words 'means for' appear together with an associated function. Each addition, deletion, and modification to the implementations that falls within the meaning and scope of the claims is to be embraced by the claims.

The terms "approximately," "about," and "substantially" as used herein represent an amount close to the stated amount that is within standard manufacturing or process tolerances, or which still performs a desired function or achieves a desired result. For example, the terms "approximately," "about," and "substantially" may refer to an amount that is within less than 5% of, within less than 1% of, within less than 0.1% of, and within less than 0.01% of a stated amount. Further, it should be understood that any directions or reference frames in the preceding description are merely relative directions or movements. For example, any references to "up" and "down" or "above" or "below" are merely descriptive of the relative position or movement of the related elements. Additionally, as used herein, the term "and/or" includes any and all combinations of one or more of the associated listed items.

The present disclosure may be embodied in other specific forms without departing from its spirit or characteristics. The described implementations are to be considered as illustrative and not restrictive. The scope of the disclosure is, therefore, indicated by the appended claims rather than by the foregoing description. Changes that come within the meaning and range of equivalency of the claims are to be embraced within their scope.

What is claimed is:

1. A method, comprising:
obtaining extracted text from well documents comprising a first document having a first format and a second document having a second format, wherein the first format comprises a first unstructured format including at least one of a PNG format or a TIFF format and the second format comprises a second unstructured format including a PDF format;
receiving a tailored prompt with instructions for extracting data from the extracted text;
providing, to a large language model, the tailored prompt;
receiving, from the large language model, the data in response to the large language model using the tailored prompt to automatically extract the data from the extracted text, the data having a third format different than the first format and the second format, the third format comprising a structured text format;
displaying, on a display, the data in an interactive table;
displaying a well schematic using the data, the well schematic comprising quality control parameters;
displaying, on the display, the well schematic nearby the data in the interactive table;
querying the extracted text to obtain actionable document insights;
updating the well documents to include the actionable document insights; and
storing, on a memory, the well documents including the actionable document insights.

2. The method of claim 1, wherein the tailored prompt includes an objective to obtain hole casing and top of cement information from the well documents, settings for the large language model, and further instructions for the large language model to use in extracting at least one of hole casing details, inputs, or examples.

3. The method of claim 2, wherein:
the further instructions comprise the extracting the hole casing details including guidelines for casing size, casing start depth, casing end depth, casing type, hole size, hole depth, the top of cement, cross-reference information, and output specifications; and
the large language model uses the instructions to automatically extract the data from the extracted text.

4. The method of claim 3, wherein the large language model uses the instructions to automatically infer the data from the extracted text.

5. The method of claim 1, wherein the tailored prompt includes an objective to obtain well property data from the well documents, sample inputs, examples for the large language model, settings for the large language model, and further instructions for the large language model to use in extracting the well property data.

6. The method of claim 5, wherein:

the instructions for extracting the well property data include well name instructions, well American Petroleum Institute (API) number instructions, a unique well identifier (UWI) instructions, and field extraction instructions; and the large language model uses the instructions to automatically extract the data from the extracted text.

7. The method of claim 1, further comprising:

receiving updated data in the interactive table;

automatically displaying a modified well schematic using the updated data; and presenting, on the display, the modified well schematic.

8. The method of claim 7, further comprising:

receiving a determination that the updated data violates an industry standard or a limit of a value by performing quality control on the updated data; and presenting, on the display, an error message in response to the determination that the updated data violates the industry standard or the limit of the value.

9. The method of claim 1, further comprising:

receiving a query for the well documents;

providing, by the large language model, a response to the query using the extracted text; and presenting, on the display, the response to the query and a citation to a source for the response.

10. The method of claim 9, further comprising:

receiving a selection of the citation; and displaying a well document corresponding to the source nearby the response.

11. A system, comprising:

a memory; and a processor operable to communicate with the memory, wherein the processor is operable to:

obtain extracted text from well documents comprising a first document having a first format and a second document having a second format, wherein the first format comprises a first unstructured format including at least one of a PNG format or a TIFF format and the second format comprises a second unstructured format including a PDF format;

receive a tailored prompt with instructions for extracting data from the extracted text;

provide, to a large language model, the tailored prompt;

receive, from the large language model, the data in response to the large language model using the tailored prompt to automatically extract the data from the extracted text, the data having a third format different than the first format and the second format, the third format comprising a structured text format;

display, on a display, the data in an interactive table;

display a well schematic using the data, the well schematic comprising quality control parameters;

display, on the display, the well schematic nearby the data in the interactive table;

query the extracted text to obtain actionable document insights;

update the well documents to include the actionable document insights; and store, on the memory, the well documents including the actionable document insights.

12. The system of claim 11, wherein the tailored prompt includes an objective to obtain hole casing and top of cement information from the well documents, settings for the large language model, and further instructions for the large language model to use in extracting at least one of hole casing details, inputs, or examples.

13. The system of claim 12, wherein:

the further instructions comprise the extracting the hole casing details including guidelines for casing size, casing start depth, casing end depth, casing type, hole size, hole depth, the top of cement, cross-reference information, and output specifications; and the large language model uses the instructions to automatically extract the data from the extracted text.

14. The system of claim 13, wherein the large language model uses the instructions to automatically infer the data from the extracted text.

15. The system of claim 11, wherein the tailored prompt includes an objective to obtain well property data from the well documents, sample inputs, examples for the large language model, settings for the large language model, and further instructions for the large language model to use in extracting the well property data.

16. The system of claim 15, wherein;

the instructions for extracting the well property data include well name instructions, well American Petroleum Institute (API) number instructions, a unique well identifier (UWI) instructions, and field extraction instructions; and the large language model uses the instructions to automatically extract the data from the extracted text.

17. The system of claim 11, wherein the processor is further operable to:

receive updated data in the interactive table;

automatically display a modified well schematic using the updated data; and present, on the display, the modified well schematic.

18. The system of claim 17, wherein the processor is further operable to:

receive a determination that the updated data violates an industry standard or a limit of a value by performing quality control on the updated data; and present, on the display, an error message in response to the determination that the updated data violates the industry standard or the limit of the value.

19. The system of claim 11, wherein the processor is further operable to:

receive a query for the well documents;

provide, by the large language model, a response to the query using the extracted text; and present, on the display, the response to the query and a citation to a source for the response.

20. The system of claim 19, wherein the processor is further operable to:

receive a selection of the citation; and display a well document corresponding to the source nearby the response.

21. The method of claim 1, further comprising displaying a graphical user interface including:

a first tab including information regarding automatic wellbore extraction; and a second tab next the first tab, the second tab showing the actionable document insights in response to the querying the extracted text and a query used in the querying the extracted text.

* * * * *